United States Patent [19]

Asahara et al.

[11] Patent Number: 5,528,489
[45] Date of Patent: Jun. 18, 1996

[54] METHOD OF AND APPARATUS FOR SCHEDULING PARTS DELIVERER RUNNING AND METHOD OF MANAGING PARTS DELIVERERS

[75] Inventors: Takao Asahara, Tajimi; Takeshi Fukuyama, Toyota; Hirofumi Kunimoto, Toyota; Katsuhiro Tanaka, Toyota; Toshikazu Tomimori, Toyota, all of Japan

[73] Assignee: Toyota Jidosha Kabushiki Kaisha, Toyota, Japan

[21] Appl. No.: 309,223

[22] Filed: Sep. 20, 1994

[30] Foreign Application Priority Data

Sep. 20, 1993 [JP] Japan ................................. 5-233347

[51] Int. Cl.⁶ .................................................. G06F 153/00
[52] U.S. Cl. ........................................... 364/402; 364/403
[58] Field of Search .................................... 364/400, 401, 364/402, 403, 478, 468, 469

[56] References Cited

U.S. PATENT DOCUMENTS

| | | | |
|---|---|---|---|
| 4,669,047 | 5/1987 | Chucta | 364/468 |
| 4,968,209 | 11/1990 | Noble | 414/343 |
| 5,063,506 | 11/1991 | Brockwell et al. | 364/402 |
| 5,148,370 | 9/1992 | Litt et al. | 364/468 |
| 5,193,065 | 3/1993 | Guerindon et al. | 364/468 |
| 5,231,567 | 7/1993 | Matoba et al. | 364/401 |
| 5,295,066 | 3/1994 | Aoki | 364/401 |
| 5,325,304 | 6/1994 | Aoki | 364/468 |
| 5,402,349 | 3/1995 | Fujita et al. | 364/468 |
| 5,442,563 | 8/1995 | Lee | 364/468 |

*Primary Examiner*—Donald E. McElheny, Jr.
*Attorney, Agent, or Firm*—Kenyon & Kenyon

[57] ABSTRACT

For delivering parts successively received in shipment units by parts deliverer to part use positions, the delivering operation time required for each parts deliverer is uniformalized. A uniformalizing plan is produced, and the delivering operation is continued according to the plan. The delivering operation time is calculated for each shipment unit (first step). The assignment of shipment units to parts deliverers is shifted such as to uniformalize the delivering operation time for each parts deliverer (third step). The shifting operation is continued until uniformalizing is obtained. As a result, uniformalized assignment can be realized.

6 Claims, 19 Drawing Sheets

METHOD OF AND APPARATUS FOR SCHEDULING PARTS DELIVERER RUNNING AND METHOD OF MANAGING PARTS DELIVERERS

BACKGROUND OF THE INVENTION

1. Field of the Invention

This invention relates to techniques of delivering parts in an assembling plant.

2. Description of the Prior Art

In an assembling plant, parts transported from parts factories are received in a parts reception place, and the received parts are delivered to places where they are used. This status is illustrated in FIG. 1. As shown, parts W1, W2, ... which are transported by trucks or the like from parts factories, are successively received in a parts reception place 11 and transferred to delivery wagons 12. The parts transferred onto the delivery wagons 12 are delivered to parts use positions L1 to Ln by parts deliverers 14, 15, ... running along a course 13 extending along the parts use positions L1 to Ln. The delivered parts W1, W2, ... are used at parts use position L1 to Ln, respectively, for assembling a product or products.

Normally, the parts deliverers 14, 15, ... are scheduled to depart from the parts reception place 11 at predetermined time instants. The transportation of the parts W1, W2, ... from parts factories, however, is not always scheduled by taking the time required for the delivering operation of the parts deliverers 14, 15, ... into considerations. Therefore, if the parts deliverers 14, 15, ... are managed under a rule that all parts existing at the parts reception place 11 at a timing when each parts deliverers 14, 15, ... departs from the parts reception place 11, the time required for the delivering operation by the parts deliverers is not constant, but some deliverers may require long times for the delivering operation while other may require short times.

FIG. 1 shows a case in which the parts W1 to W4 have already been received in the parts reception place 11 at the time of the departure of the parts deliverer 14, while the parts W5 are delivered after the departure of the parts deliverer 14 and before the departure of the parts deliverer 15. In this case, if all the parts W1 to W4 are delivered by the parts deliverer 14, the delivering operation is excessive for the parts deliverer 14 while it is insufficient for the next parts deliverer 15. As shown in FIG. 1, the burden of the delivering operation may be averaged by changing the deliverer for the parts W4 from the deliverer 14 to the deliverer 15.

When excessive parts have been received in the parts reception place 11 as in the above case, it is in practice in the prior art that the personnel in charge of the parts delivery determines parts to be delivered by the parts deliverer 14 at this time and other parts which are to be left for the next parts deliverer 15. Shown in FIG. 1 is an exemplary case in which the parts W1 to W3 are delivered by the parts deliverer 14 while leaving the parts W4 for the next parts deliverer 15 to deliver the parts W4 together with newly delivered parts W5 by the next parts deliverer 15.

At this time, it is not so easy to determine which parts are to be delivered at this time and which parts are to be left for the next deliverer so that the delivering operation time for each parts deliverer are substantially uniformalized. A graph labeled (A) in FIG. 1 shows an example of delivering operation times T1 to T5 required for the individual parts W1 to W5. In this example, the total delivering operation time T14 required for the parts deliverer 14 to deliver the parts W1 to W3 is extremely long compared to the total delivering operation time T15 required for the parts deliverer 15. In this case, it may be thought to shift the parts W3 from the parts deliverer 14 to the parts deliverer 15. Doing so, however, leads to an excessive total delivering operation time for the parts deliverer 15.

Up to date, it has been in practice to leave the assignment of the parts W1, W2, ... received in the parts reception place 11 to the parts deliverers to the experience and skill of the operators, and the time or burden for the delivering operation between adjacent parts deliverers is not uniformalized at all times.

SUMMARY OF THE INVENTION

Accordingly, it is an object of the invention to provide a technique of objectively and logically determining the assignment of parts with uniformalized delivering operation burden or time between adjacent parts deliverers by introducing a scientific analysis process into the procedure of assigning the parts to parts deliverers and also provide a technique of logically managing the parts deliverers with such assignment determination technique.

For an objective and logical procedure of assigning the parts to parts deliverers, a method of scheduling parts deliverer running that has been developed according to the invention comprises the following steps.

In its concept as shown in FIG. 2, the scheduling method is to schedule the running of the parts deliverers for delivering parts received as shipment units W1, W2, ... at parts reception place to parts use positions L1 to Ln.

First step: In this step, the required delivering operation times T1, T2, ... are calculated for the individual shipment units W1, W2, ...

Second step: In this step, the delivering operation time required for each parts deliverer is calculated by abridging or summarizing the delivering operation times T1, T2, ... calculated in the first step for the shipment units received between adjacent parts deliverers. FIG. 2 shows an exemplary case in which the shipment units of parts W1 to W4 have been received before the departure of the first parts deliverer and the shipment unit W5 of parts is received between the departures of the first and second parts deliverers.

Third step: In this step, the assignment of shipment units W1, W2, ... to the parts deliverers is shifted such as to uniformalize the delivering operation time for each pars deliverer. In the case of FIG. 2, because the delivering operation time required for the first parts deliverer is longer than that of the second parts deliverer, the shipment units W3 and W4 are shifted from the first to the second parts deliverer for the uniformness of the delivering operation time.

Fourth step: With respect to the parts deliverers to which the assignment has been shifted in the third step, the delivering operation time for each parts deliverer is calculated again for the shipment unit or units newly assigned to each of the parts deliverers. In the case of FIG. 2, the shipment units W1 and W2 are assigned to the first parts deliverer, and the shipment units W3 to W5, to the second parts deliverer. In the case of FIG. 2, delivering operation time T1+T2 is calculated for the units W1 and W2 assigned to the first parts deliverer, and that T3+T4+T5 is determined for the units W3 to W5 assigned to the second parts deliverer.

Repeat step: In this step, the third and fourth steps are executed repeatedly until the delivering operation time calculated again for each parts deliverer in the fourth step becomes a predetermined uniformalizing level. The case of FIG. 2 shows that, because of a substantial difference between the time T1+T2 and the time T3+T4+T5 that are calculated in the fourth step, the third step is executed again, and as a result, the shipment unit W4 is shifted from the second to the first parts deliverer. As a result of the subsequent execution of the fourth step, the delivering operation time T1+T2+T4 of the first parts deliverer and the delivering operation time T3+T5 of the second parts deliverer are made to be substantially equal, that is, the delivering operation times for the individual parts deliverers are uniformalized to the predetermined uniformalizing level. Thus, in this example, the step of repeating the third and fourth steps is ended at this time.

When the assignment of the shipment units to the parts deliverers has been determined in the above way, the individual parts deliverers deliver the assigned shipment unit or units. Since at this time the delivering operation times of the individual parts deliverers have been uniformalized as a result of the repeated execution of the third and fourth steps, there is no possibility that hard and easy delivering operations are scheduled alternately, and it is possible to permit delivering operations to be continued at a uniform pace.

In the above parts deliverer running scheduling method, preferably the shipment units of parts are assigned to any of a predetermined number of successive parts deliverers subsequent to the timing of their reception in the parts reception place and are shifted uni-directionally or back and forth between adjacent parts deliverers. In a case shown in FIG. 3, for instance, in which the predetermined number of successive parts deliverers is P+1, shipment units m1 to m2 that have been received in the parts reception place prior to the departure of a parts deliverer p1 may be assigned to any of the subsequent parts deliverers p1 to p1+P, and shipment units m3 to m4 received between the parts deliverers p1 to p1+1 may be assigned to any of the parts deliverers p1+1 to p1+1+P. With this scheduling, there is no possibility that the received shipment units are left in the parts reception place for long time, but they are delivered by any of the P+1 parts deliverers soon after their reception. In addition, with this scheduling, there is no need of delivering parts whenever they are received, and it is possible to uniformalize the delivering operation times. Further, the shift of assigned shipment units may be done uni-directionally, as exemplified by arrows s1 and s2 in FIG. 3, or it may be made back and forth, as exemplified by arrows s3 and s4. Combining the uni-directional and back-and-forth shifts for the standardization improves the extent of the attainable uniformness.

The object of the invention is also attainable by a parts deliverer running scheduling apparatus, the concept underlying which is schematically shown in FIGS. 4(A) and 4(B). This apparatus comprises a reception data file 41, a parts data file 42, a basic operation time data file 43, first calculating means 44, second calculating means 45, uniformalizing means 46, third calculating means 47, and uniformness judging means 48.

In the reception data file 41, data of the kinds and quantities of received parts in shipment units (W1, W2, ... in FIG. 2) and instants of the reception in the parts reception place are stored in a mutually related manner. In the parts data file 42, data of the kinds of parts and parts use position thereof are stored in a mutually related manner. In the basic operation time data file 43, data of a basic operation time necessary for the calculation of the time required for the delivering operation, for instance, an average processing time per box of parts, is stored.

The first calculating means 44 calculates the time required for the delivering operation for each shipment unit according to the data stored in the three different data files 41 to 43. Since data of the kinds and quantities of the received parts are stored in the reception data file 41, data of the parts use positions of these parts are stored in the parts data file 42 and the basic operation time data are stored in the basic operation time data file 43, it is possible to calculate the time required for the operation of delivering parts included in the shipment unit, the calculation being executed by the first calculating means 44. The second calculating means 45, uniformalizing means 46 and third calculating means 47 are provided for executing the second to fourth steps shown in FIG. 2. The uniformness judging means 48 causes, if the time uniformness is insufficient, the uniformalizing means 46 and third calculating means 47 to be started again for repeating the uniformalizing process. With this apparatus, uniformalized running scheduling can be obtained automatically.

The apparatus further comprises means 49 for displaying the assignment of shipment units of parts to parts deliverers when the uniformalizing means 46 and third calculating means 47 are no longer started again by the uniformness judging means 48, that is, the finally determined assignment of the shipment unit or units to the parts deliverers, by indicating the parts deliverers with the shipment unit or units assigned thereto. With the provision of this means 49, it is clearly shown which shipment units of parts are delivered by which parts deliverers.

Preferably, the apparatus further comprises means 50 for outputting the summarized relation between the individual parts deliverers, the finally assigned shipment units thereto and the parts use positions thereof. The summarized relation can be prepared from the finally determined assignment of shipment units of parts to parts deliverers and also from data in the reception data file 41 and the parts data file 42. This means 50 can at-sight display, for each parts deliverer, the kinds of parts assigned to the parts deliverer and places of use of these parts. Thus, the parts deliverer operator can understand at sight which parts use positions to be stopped to deliver which kind of parts.

The object of the invention can further be attained by a parts deliverer managing method as schematically shown in FIG. 5.

In this method, a plurality of separate parts reception places are provided. In the case of FIG. 5, two separate, i.e., a first and a second, parts reception places 51 and 52 are provided, but it is possible to provide more than two parts reception places.

In this parts deliverer managing method, each parts deliverer is managed to deliver all parts that have been received in each parts reception place. For example, if shipment units W1, W2 and W4 of parts have been received in the first parts reception place 51 before a parts deliverer departs from the place 51, the parts deliverer delivers all these parts.

In this method, a plurality of parts reception places are circulatorily made to be a departing place of each parts deliverer. In the case of FIG. 5 in which two parts reception places are provided, a first parts deliverer is managed to depart from the first parts reception place 51, a second parts deliverer to depart from the second parts reception place 52, a third parts deliverer to depart from the first parts reception place 51, and so forth. Where three separate parts reception places are provided, these places are taken as the departing places by parts deliverers in the order of the first, the second, the third and then again the first one.

In this method, either one of the plurality of parts reception places is designated for each shipment unit of parts, and also the time required for the operation of delivering parts received in the designated parts reception place is uniformalized for each parts reception place.

Thus, the personnel in charge of the transportation of parts may transport shipment units of parts to the designated parts reception place, and the parts deliverer operator may deliver all parts received in the parts reception place from which to depart. Consequently, the delivering operation time for each parts deliverer is naturally uniformalized.

With the scheduling method comprising the above steps, the assignment of shipment units of parts to parts deliverers is determined such as to uniformalize the delivering operation time for each parts deliverer, and running schedule with uniformalized operation burden for each parts deliverer can be obtained. This scheduling method is carried out by the above scheduling apparatus.

Further, with the above parts deliverer managing method as schematically shown in FIG. 5, the delivering operation time for each parts deliverer is naturally uniformalized to permit easy management of the running of the parts deliverers.

BRIEF DESCRIPTION OF THE DRAWINGS

The present invention will be more fully understood from the following detailed description and appended claims when the same is taken with the accompanying drawings, in which:

PREFERRED EMBODIMENT OF CARRYING OUT THE INVENTION

Figure 1:
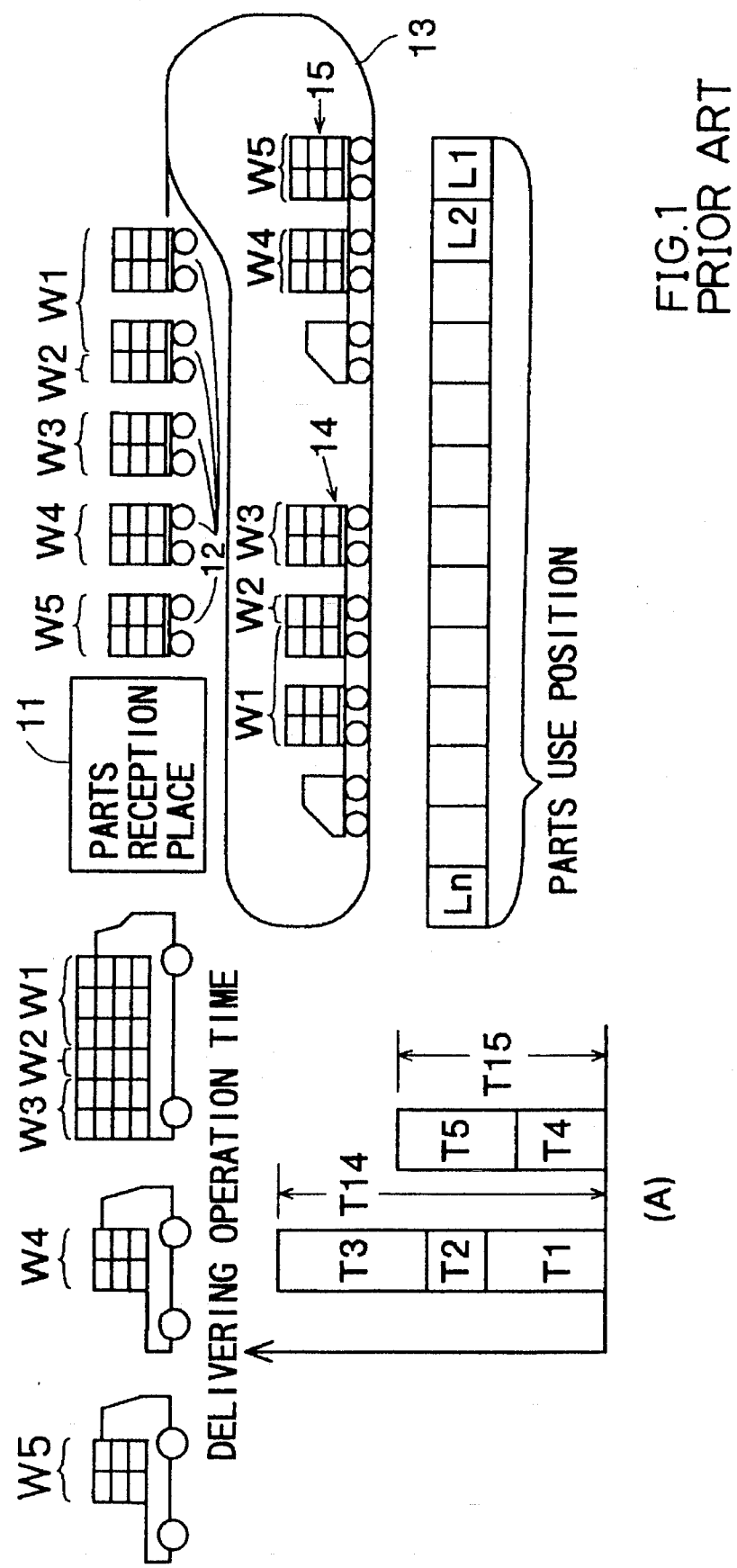
FIG. 1 is a schematic view showing a prior art parts deliverer managing method.

The invention will now be described in conjunction with an embodiment thereof applied to a car assembling plant with reference to FIG. 6 (A) seq. The plant illustrated in FIGS. 6(A) and 6(B) has two production lines (one of which is not shown) for assembling cars 61. A parts shelf array 62 for accommodating parts necessary for the assembling of cars is installed along each production line. Since parts are taken out from the parts shelf array 62 to be used, those who are engaged in the delivering of parts are required to deliver new parts to the parts shelf array 62. This parts shelf array 62 corresponds to the parts use position.

The parts shelf array 62 is very long. The parts use positions (designated at 67a, 67b, . . . ) are largely classified into groups 63. Each group corresponds to each step in the production line. Each group 63 of parts use positions is in turn classified into sub-groups 64, 65, 66, . . . provided with respective addresses. Each parts use position in each address is specified by a preliminarily assigned rack No. Thus, each parts use position in the parts shelf array 62 is specified by a step, an address and a rack No.

The plant utilizes parts deliverers for delivering parts to the parts shelf array 62. The parts deliverer is constituted by a trailer 69 trailing wagons 68 for carrying parts W to deliver these parts W to the parts shelf array 62. There is a predetermined running route (or course) of the parts deliverer along the parts shelf array 62. In this plant, several parts deliverer running courses are provided to permit delivery of parts to any parts use position in the parts shelf array 62. In FIG. 6(B), only two courses (i.e., a red course and a blue course) are shown. Parts W1, W2, . . . are transported by trucks or the like from parts factories to a parts unloading place 70 and transferred by fork lifts 71 or the like to parts reception places 72. At this time, the parts W1, W2, . . . are transferred onto wagons 68. In the prior art, only one parts reception place is provided for each course of parts deliverer. According to the invention, a plurality of, in this embodiment three, separate parts reception places or lanes 72 are provided for each course. Specifically, as shown in FIG. 6(B), three parts reception places or lanes R1 to R3 are provided for the red course, and three others B1 to B3 for the blue course. However, the number of parts reception places for each course is not limited to three, but it is possible to provide two or four or more parts reception places. In each parts reception place, wagons 68 onto which parts are transferred are connected to each other into a train called, for instance, R1 lane.

Parts W are transported from parts factories, and a group of parts transported from one parts factory at the same time is handled collectively as a shipment unit of parts. Usually, one truck provides one shipment unit of parts. However, sometimes one truck simultaneously provides a plurality of shipment units from a plurality of parts factories. One shipment unit may be constituted by only a single kind of parts or by a plurality of different kinds of parts.

In this embodiment, a parts reception place (or lane) indicator 31 is provided at the entrance of each parts reception place (or lane). The parts reception place (lane) indicator 31 mainly comprises a large-scale screen on which instructions as to which shipment unit of parts is to be transferred to which lane are displayed. The operator who operates the fork lift 71 selects the lane for transfer with reference to the contents of the display and the shipment unit that is being carried.

The trailer 69 departs from a predetermined lane at a scheduled time and runs along a scheduled course. When departing from the lane, it trails all the parts that have been transferred to the lane. Thus, unlike the prior art, there is no need for the parts deliverer scheduler to determine which parts are to be delivered and which parts are to be left for the next time.

Each trailer 69 has a radio wave transmitter, and an antenna 75 for receiving the radio waves from the transmitter is installed at the lane outlet. By receiving radio waves from the trailer 69 via the antenna 75, it is possible to collect data of the time instants of departure of the parts deliverers from the lanes. Besides the lanes, a trailer running managing unit 74 is provided and serves to display data about when each parts deliverer is to be departed from which lane. This departure instruction data is compared to the above departure time instant collection data to monitor such abnormality as failure of departure of a parts deliverer at a scheduled time or departure of a parts deliverer at a time which is not scheduled.

A delivery list printing unit 34 is provided aside each lane. The printing unit 34 mainly comprises a printer for printing a delivery list for each parts deliverer, the delivery list having contents of where to stop the trailer 69, what to unload from which wagon 68 and which position of the parts shelf array 62 to deliver the parts to. The operator of the trailer 69 carries out the delivering operation with reference to the outputted delivery list.

The instructions about what parts are to be delivered to which positions of the parts shelf array 62 are often changed in dependence on the circumstances of the production line. Accordingly, the plant is provided with a parts shelf array address managing unit 77. This unit 77 reads out new data whenever a change is produced in the data indicating what kind of parts to be delivered to which position of the parts shelf array 62.

The plant adopts a commonly termed label system (Kanban system). Transported units of parts are delivered together with labels. The label is called "Kanban". Each label is collected when the corresponding parts have been used. The collected label is sorted in a sorter 78 and returned to a return truck 80 from an ordering post 79. The label that is returned at this time is dealt with such that specified amounts of specified kinds of parts are ordered, and the ordered amounts of parts are delivered to the plant on a subsequent truck. The sorter 78 is provided with an ordering result data collector 81.

A trailer running scheduling unit 82 is provided to uniformalize the delivering operation time for each parts deliverer under the above circumstances. In order that the parts deliverers are managed in accordance with the running schedule produced in the running scheduling unit 82, the instruction contents of the parts reception place (lane) indicator 31, the contents of processing in the trailer running managing unit 74 and further the contents of printing in the delivery list printing unit 34 are controlled.

Figure 7A:
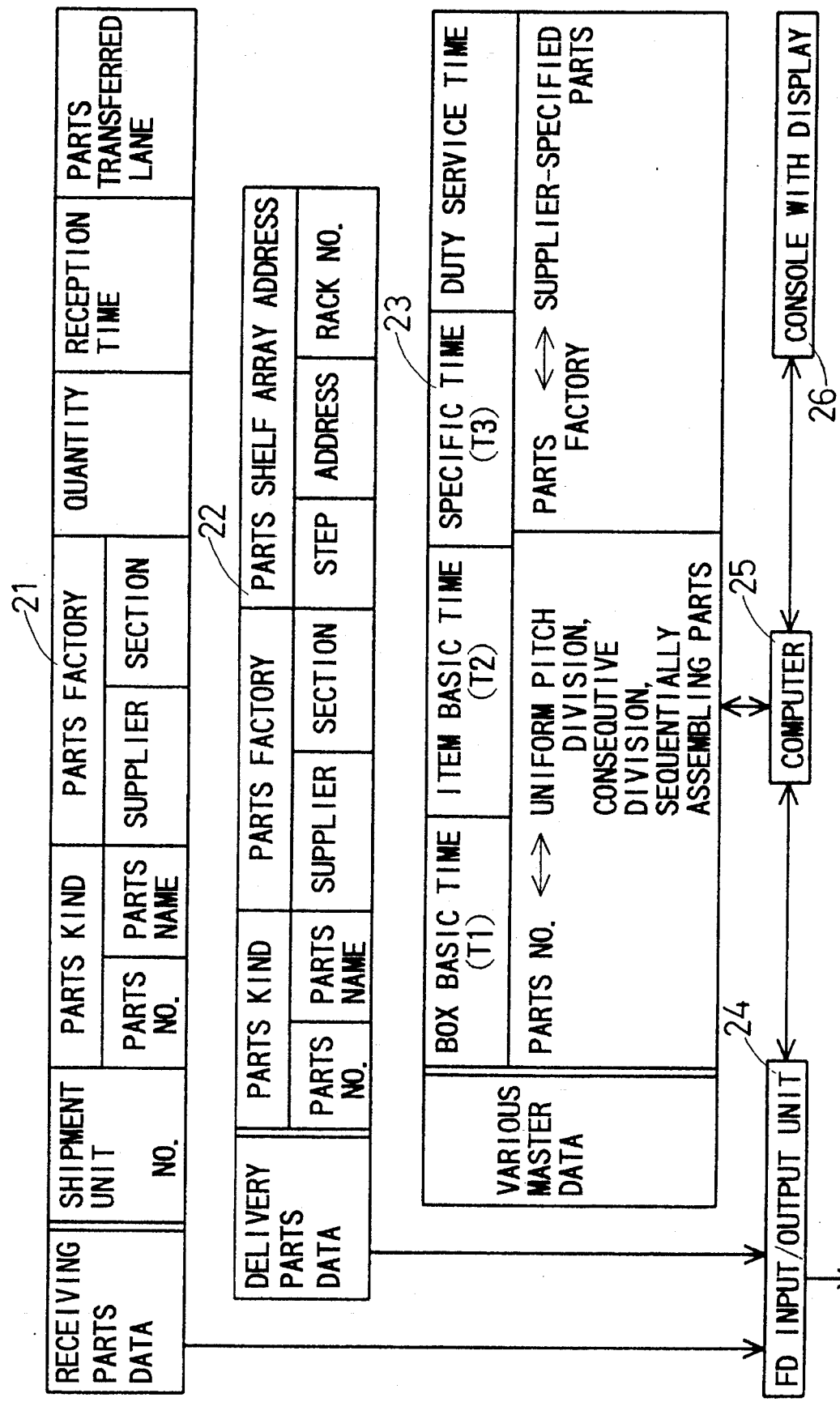
FIGS. 7(A) and 7(B) are a block diagram showing a trailer running scheduling unit embodying the invention.
Figure 7B:
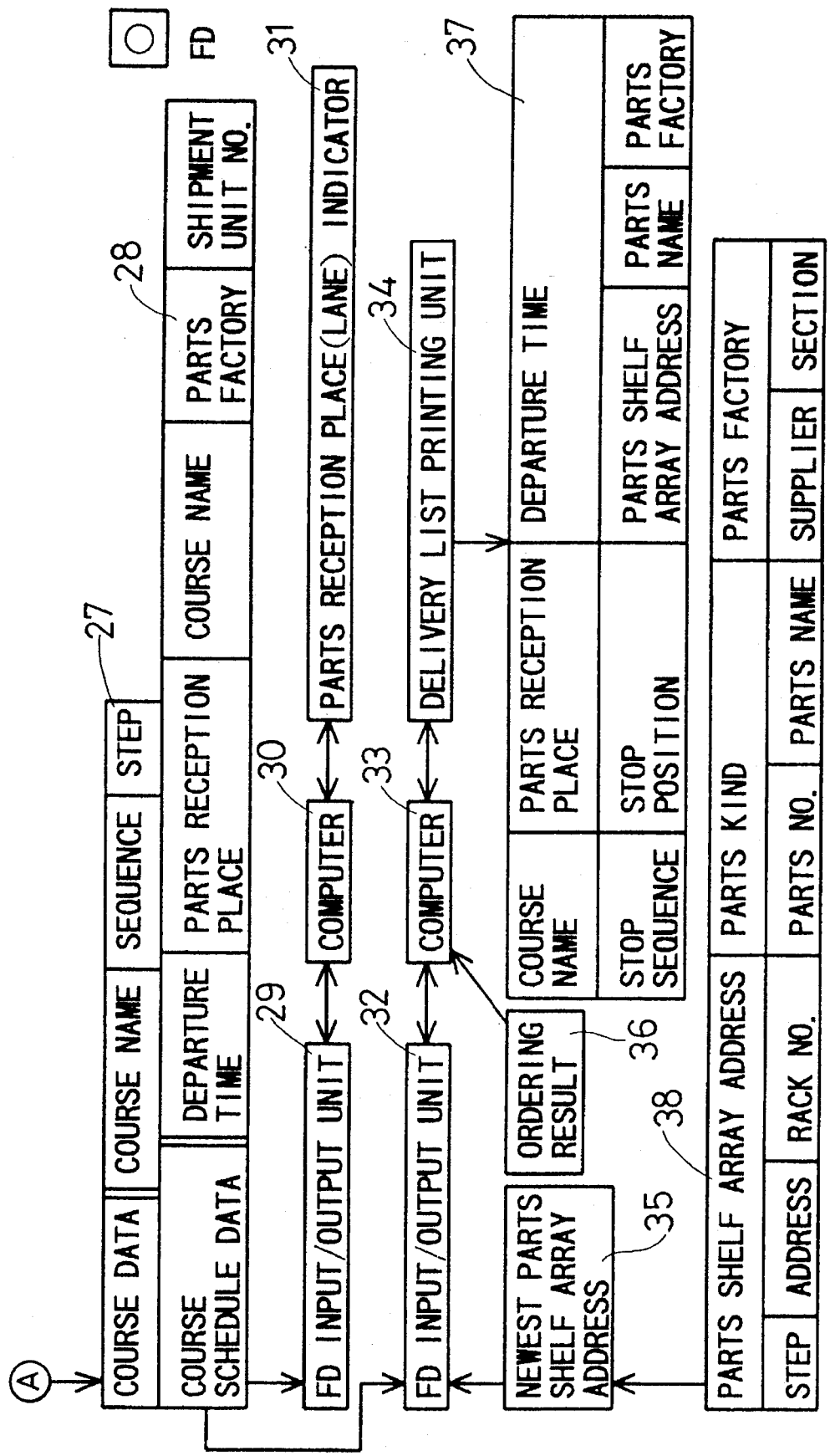

The trailer running scheduling unit 82 mainly comprises a computer and has a constitution as shown in FIGS. 7(A) and 7(B). Designated at 25 is the computer as the center of the unit 82. To the computer 25, a floppy disk input/output unit 24 and an input/output console 26 with display are connected. Receiving parts data 21 and delivery parts data 22 which are stored in a floppy disk, are read into the computer 25. Further, various master data are inputted to and stored in the computer 25. Instead of the floppy disk input/output unit 24, it is possible to input the receiving parts data 21 and the delivery parts data 22 from a remote data base via a communication apparatus (not shown).

The receiving parts data 21 is provided for each shipment unit No., and its contents include the kind or kinds of parts in the shipment unit, the parts factory thereof, the quantity thereof, and the time of the reception thereof. The parts reception place (or lane) data can be stored in this data 21. The receiving parts data 21 may be calculated from an actually ordered data collected in the ordering result data collector 81. As an alternative, the data 21 may be calculated from a parts logistics plan. When a monthly production plan of the plant is fixed, the amount and kind of the parts which are necessary to meet the production plan can be calculated, and therefore, the parts logistics plan can be calculated from the production plan. In the case of this embodiment, a monthly car production plan is worked out, and on the basis of this plan, a parts logistics plan is worked out. The receiving parts data 21 are determined from the parts logistic plan. In the data 21, the kind of parts is described, in addition to the parts No., as the parts name to facilitate the understanding. The parts factory is described by supplier's name and factory name (or section name thereof). The data 21 permit one to understand what parts are to be received in what quantity, at what time and in what shipment unit.

The delivery parts data 22 have contents of the kind or kinds of parts and the parts use position or positions, the contents being related to one another. The data 22 are determined from production conditions in the assembling plant, etc. The kind of parts is defined as parts No. and parts name. The parts use position in the parts shelf array is defined in terms of the step, address and rack No. For the convenience of understanding, the parts factory (defined as the supplier and factory section) corresponding to the kind of parts is also added. The data are updated whenever a great change is produced in the parts use positions. That is, when the parts shelf array address managing unit 77 in FIG. 6(A) updates the relation between parts and parts use positions to cause a great change in the data, the delivery parts data 22 are updated.

The various master data 23 stored in the computer 25 are various basic data. One of the various basic data is box basic time T1. The box basic time T1 is a time required for delivering operation of one box in standard size and weight. The other data contents are item basic time T2, specific time T3, duty service time, parts No. ←→ uniform pitch division, consecutive division, sequentially assembling parts, and parts factory ←→ supplier-specified parts.

Figure 10:
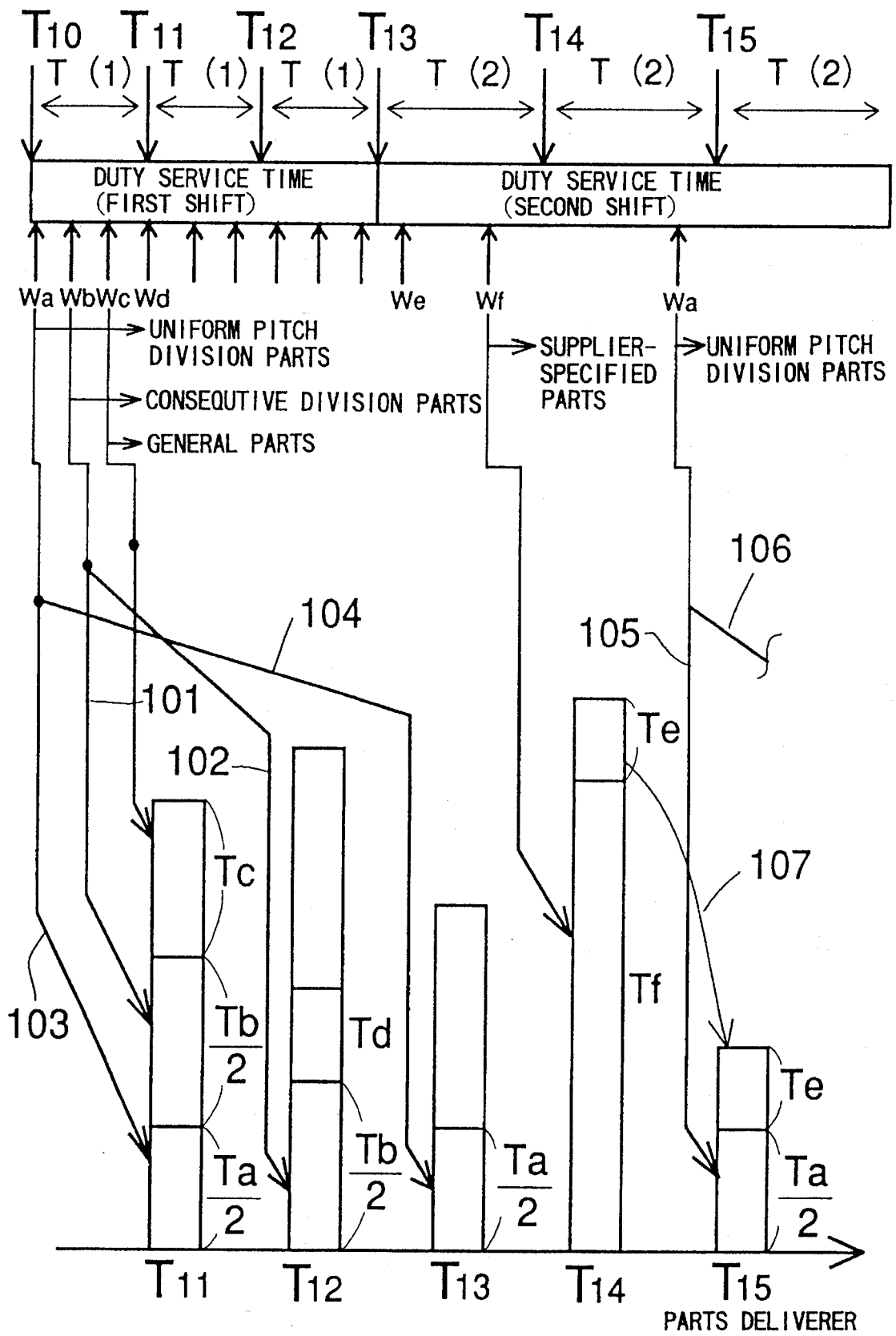
FIG. 10 is a graphic representation of the concept of assignment of shipment units of parts to parts deliverers.

With less used parts, such a calculation may arise that one parts deliverer delivers, for instance, 0.5 box of parts per one step. In such a case, actually the delivery is required for one of two parts deliverers and not for the other parts deliverer. When the delivery is necessary, it takes a time until the operator moves to the delivery position by decelerating and stopping the parts deliverer. This time is not taken when the delivery is not required. This time is the item basic time T2 in the master data 23. With large size parts or the like which require very long delivering operation time, the delivering operation time can not be calculated accurately from to the average processing time. For this reason, the specific time T3 is provided. The specific time T3 is determined for and in relation to each specific kind of parts. As shown in FIG. 10, the duty service time is the duty service time in each shift of the assembling plant. Overtime, if any, is added to the duty service time.

In some cases, parts which have been transported to the parts reception place at a time have to be delivered by two parts deliverers. These parts are classified into two different kinds of parts. Parts which are referred to as consecutive division parts, are delivered on two consecutive parts deliverers as shown at 101 and 102 in FIG. 10. In the other kind of parts are the uniform pitch division parts which are delivered to the parts shelf array at a uniform pitch as shown by arrows 103 to 106 in FIG. 10. As for the sequentially assembling parts, necessary quantities are delivered by all parts deliverers. Data about which parts are uniform pitch division parts, which parts are consecutive division parts and which parts are sequentially assembling parts are stored among the master data 23.

Among parts transported from a specific parts factory are those which are in so large shipment unit that they can not be delivered together with other parts. Such parts are referred to as the supplier-specified parts, and data as to which parts are supplier-specified parts are stored among the master data 23.

Course data 27 are inputted from the console 26. This data specify which course is to be taken by each parts deliverer for which step (i.e., step in the production line). The data are updated whenever the course is changed.

Figure 8:
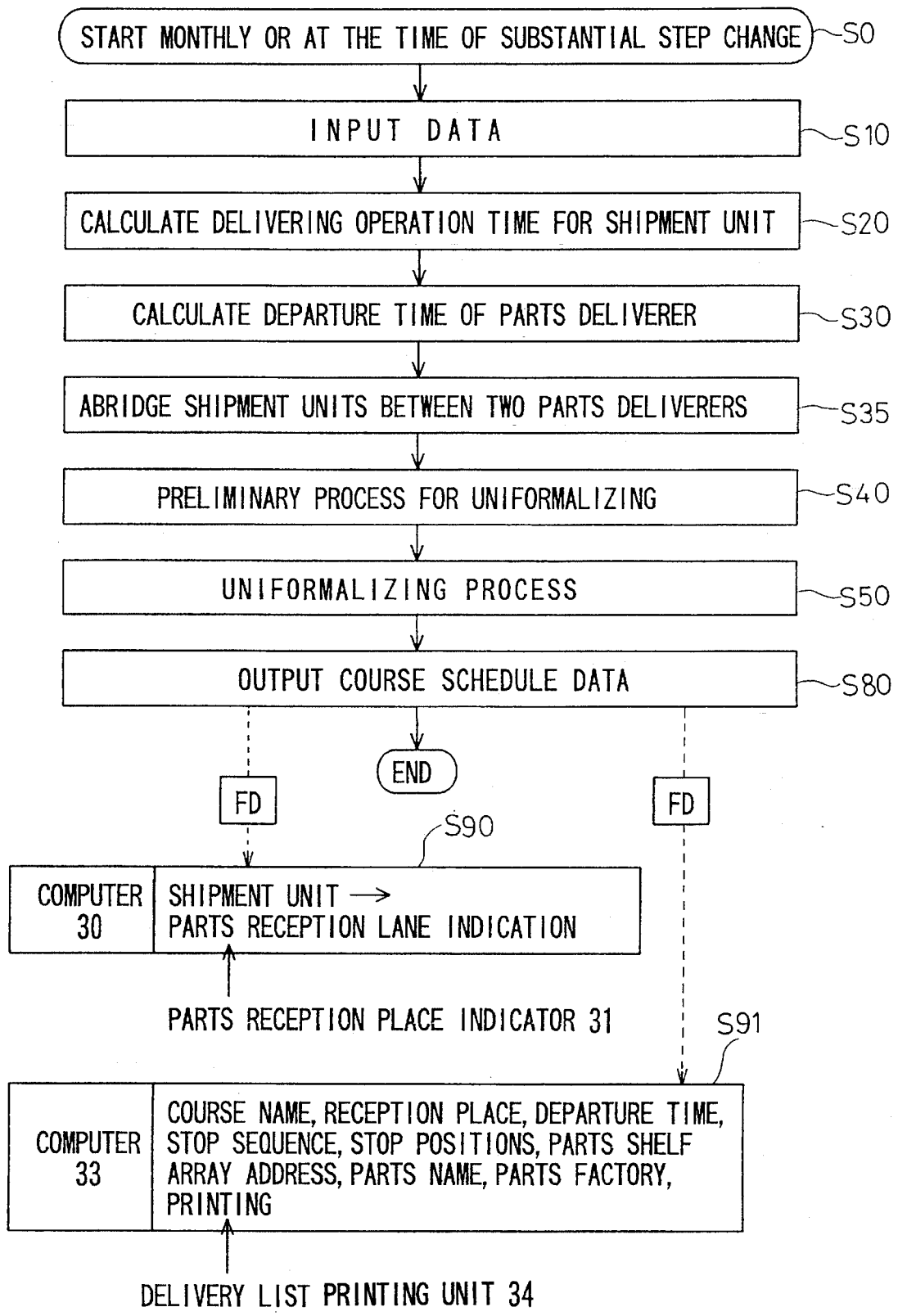
FIG. 8 is a flow chart illustrating the main routine executed by the embodiment of the trailer running scheduling unit.

The computer 25 determines course schedule data 28 through a routine shown in FIG. 8 and outputs the data 41 to a floppy disk. The course data 27 are also outputted to the floppy disk.

FIG. 8 shows a routine executed by the computer 25. This routine is executed monthly or at the time of a substantial step change as shown in step S0. When the routine is started, the receiving parts data 21 and the delivery parts data 22 are inputted from the floppy disk (step S10). The master data 23 have already been inputted to the computer 25.

When the data have been inputted, the delivering operation time is calculated for each shipment unit of parts (step S20). This process is shown in detail in FIGS. 9(A) and 9(B), and also its content will be understood with reference to FIG. 10.

Figure 9A:
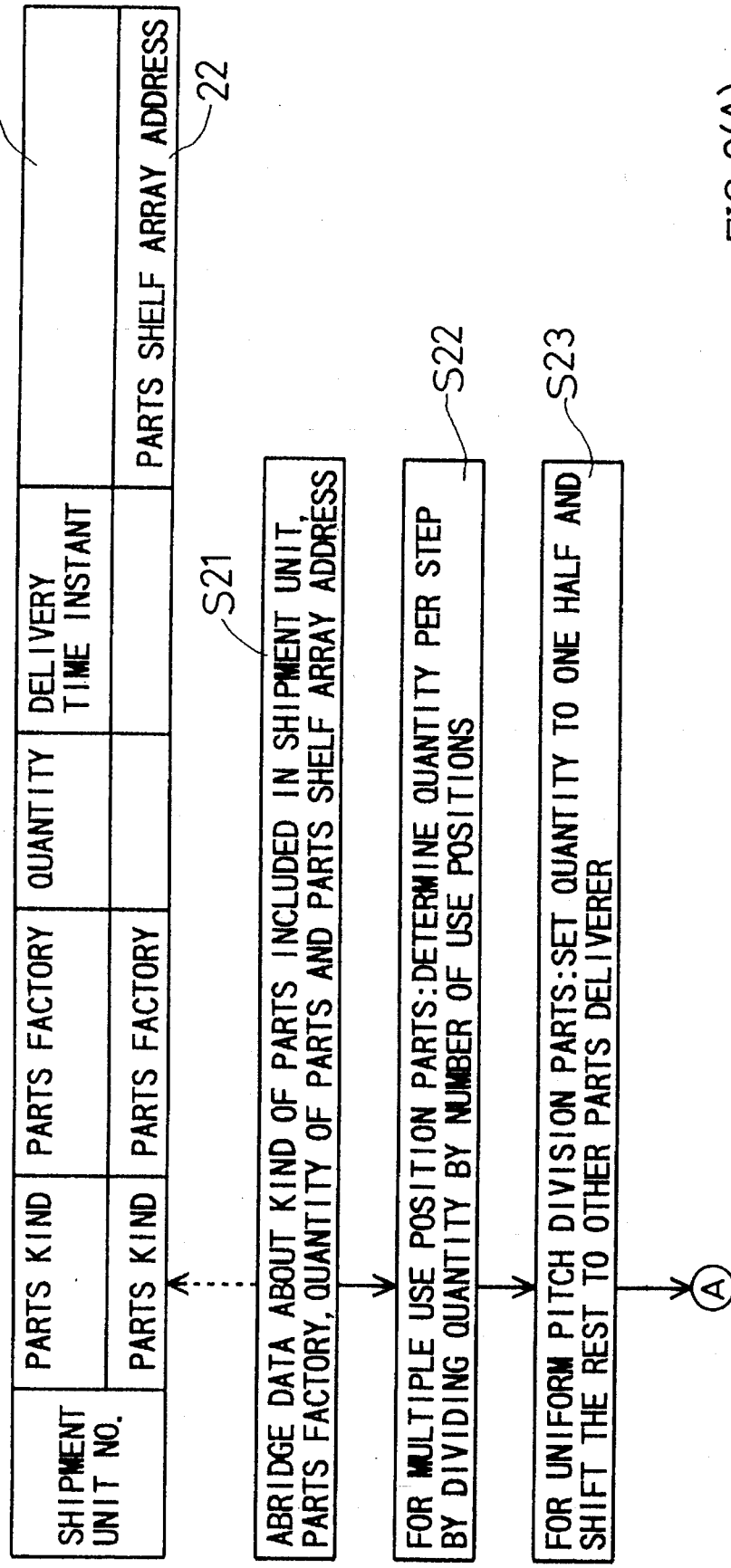
FIGS. 9(A) and 9(B) are a flow chart illustrating a process of delivering operation time calculation for each shipment unit of parts.

As a result of the input of the receiving parts data 21 and the delivery parts data 22 in step S10 in FIG. 8, data as shown in FIG. 9(A) have been inputted in the computer 25. In consequence, it is possible to obtain an abridgment of what parts are contained in what quantities in a shipment unit of parts and where these parts are to be delivered for use. In step S21 in FIG. 9(A), data relating "kind of parts, parts factory, quantity of parts and parts shelf array address" with respect to a shipment unit of parts are abridged.

Among parts are bolts or like which are used in two or more steps in the production line. With such parts which are to be delivered for two or more steps (i.e., multiple use position parts), the average quantity to be delivered per step is calculated by dividing the total quantity by the number of corresponding use positions (step S22). As for the uniform pitch division parts, only one half is delivered per parts deliverer. That is, the quantity of delivery is set to one half, and the remaining one half is shifted to another parts deliverer to make the delivering pitch uniform (step S23). Likewise, as for the consecutive division parts, the delivery quantity is set to one half, and the rest is shifted to the next parts deliverer (step S24).

As a result of the above process, it is possible to grasp, with the step as a key, the kind and quantity of parts to be delivered to the parts shelf array for that step with respect to the shipment unit of parts, and the obtained data are abridged (step S25). It is thus possible to permit understanding of what quantity of what kind of parts is to be delivered to the parts shelf array corresponding to the step.

In step S26, parts are checked as to whether they permit the delivering operation to be carried out on average base. That is, a check is done as to whether the parts are those for which the specific time T3 shown in FIG. 7(A) is stored. If the parts require a specifically long delivering time, the specific time T3 is stored, and step S26 provides "YES". In this case, the delivering operation time for the step is calculated in step S28. T3 is the time required for the delivery of unit box of specific parts, and T2 is the basic operation time increasing in proportion to the item number. With parts other than the specific parts, the delivering operation time for the step is calculated in step S27. T1 is the basic time required for the delivery of one box of average parts.

Figure 9B:
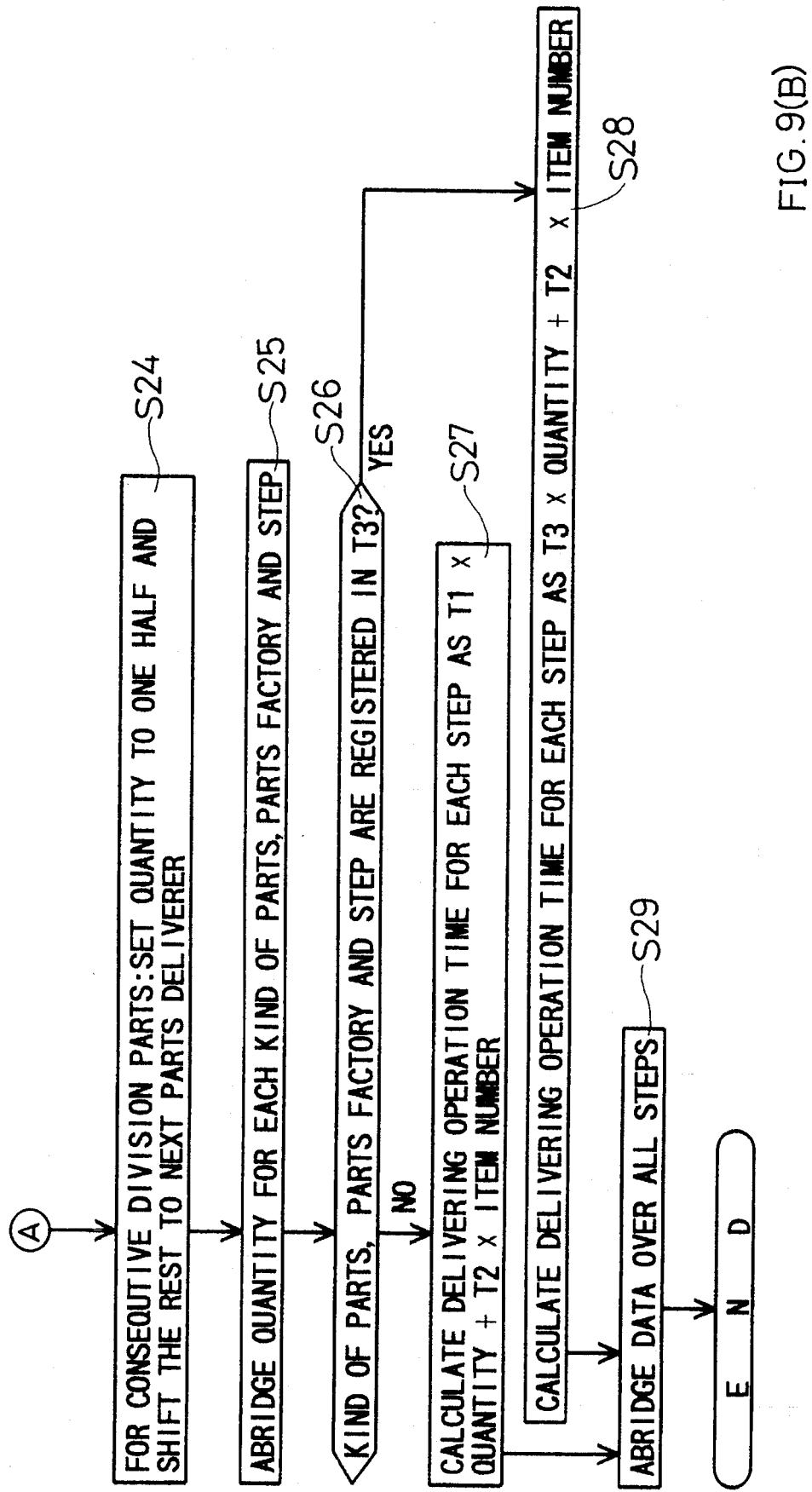

The item number used in steps S27 and S28 in FIG. 9(B) is the number of boxes of parts delivered per step. It is made "1" in case when one or more boxes are delivered per step. With less used parts, it may be calculated that one parts deliverer delivers, for instance, 0.6 box per step. This calculated box number which is less than "1" is also made the item number. Specifically, the item number of 0.6, for instance, means that the probability that the delivering operation is necessary for the step is 60%, and this portion is calculated in steps S27 and S28. If the box number is "1" or above, the delivering operation is 100% necessary. In this case, a delivering operation time which is proportional to the box number is added to the item basic time T2. In step S27 or S28, a calculation is made as to which step requires how long delivering operation time for one shipment unit of parts. In step S29, the time required until completion of the delivery of one shipment unit of parts is calculated through abridging of the calculated data obtained in step S27 or S28 for all the steps.

Figure 2:
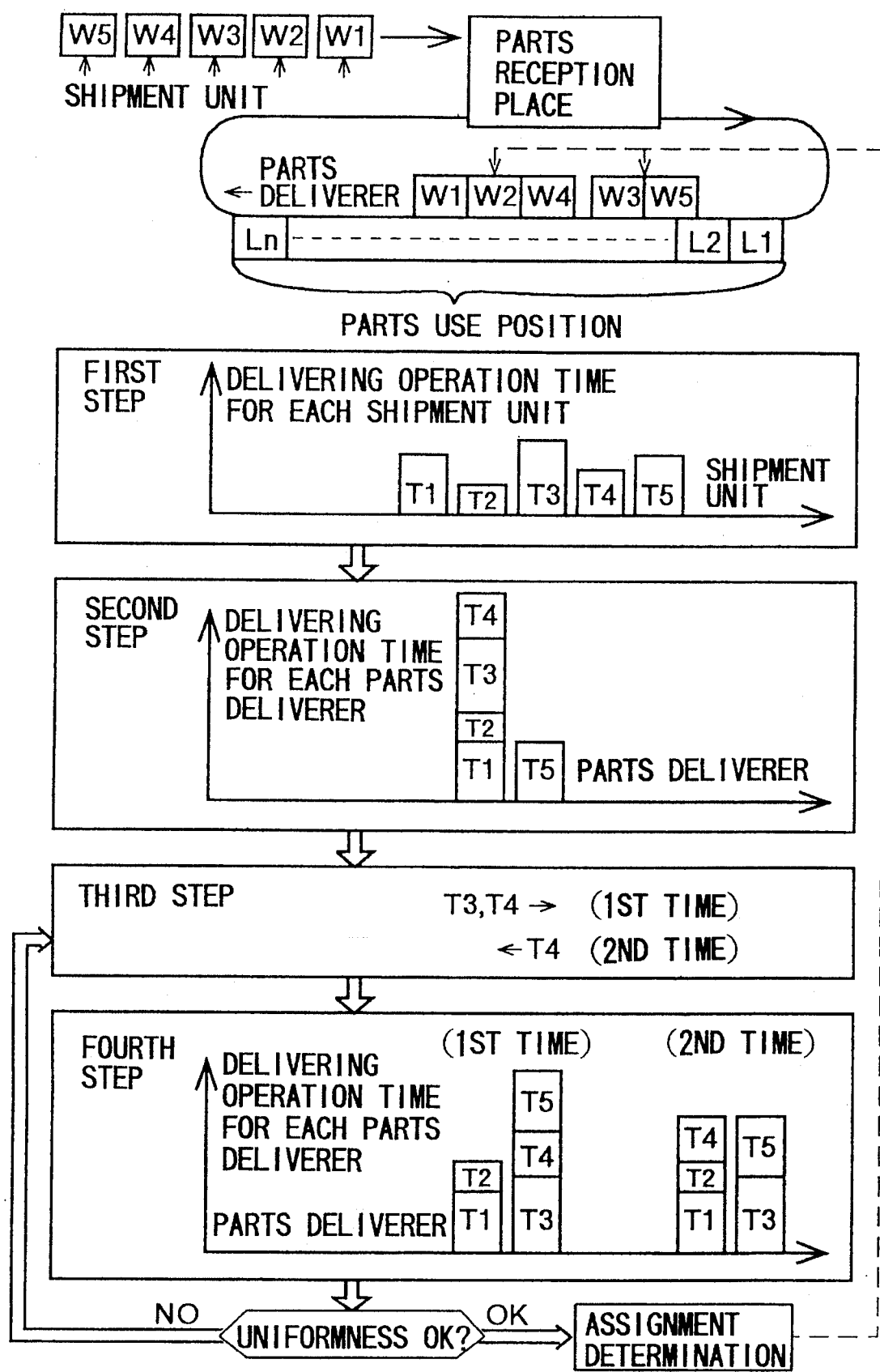
FIG. 2 is a schematic view showing a method of scheduling parts deliverer running according to the invention.
Figure 4A:
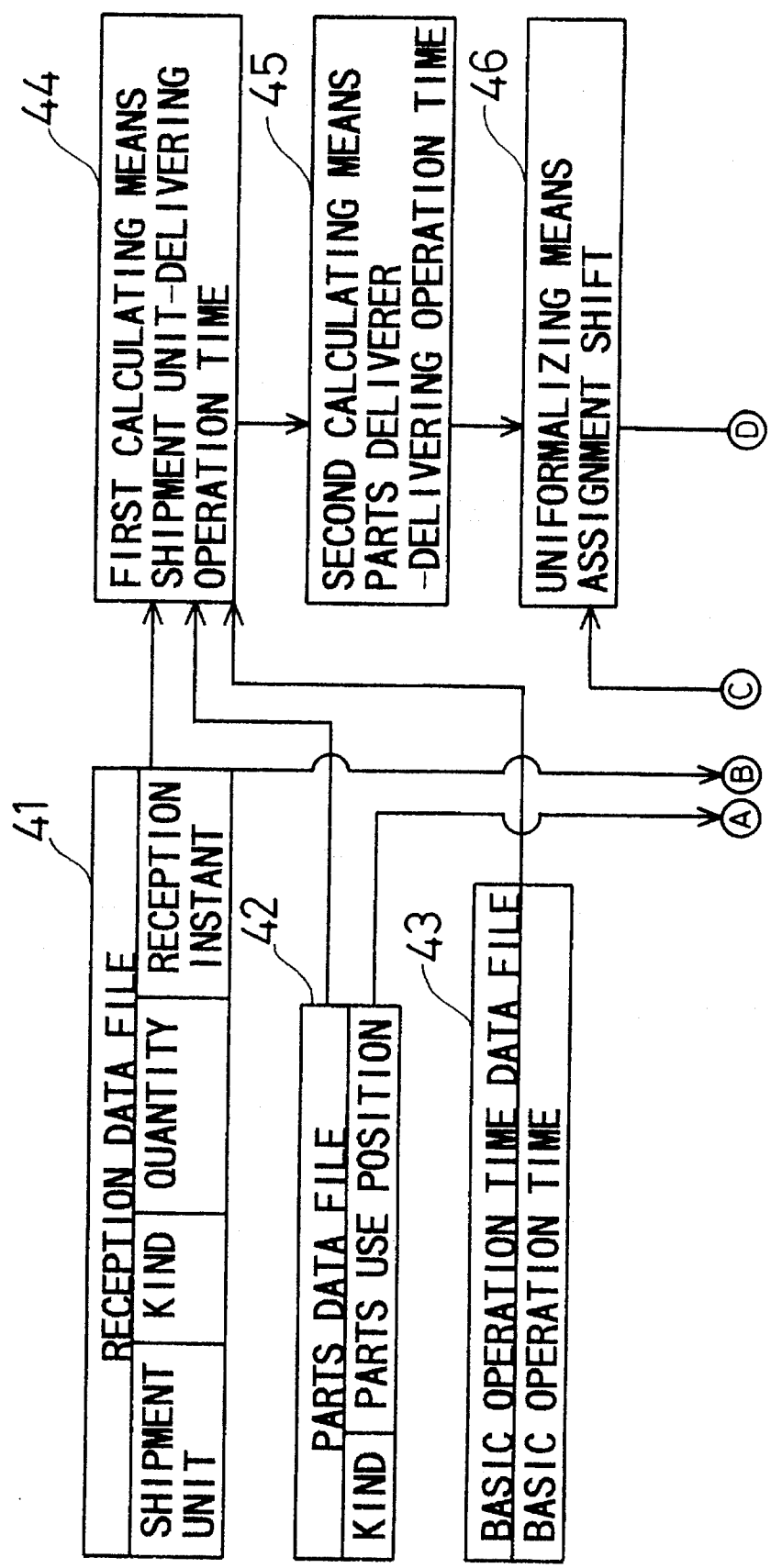
FIGS. 4(A) and 4(B) are a schematic block diagram showing an apparatus for scheduling parts deliverer running according to the invention.

In this embodiment, the process shown as the first step in FIG. 2 is realized as the routine shown in FIGS. 9(A) and (B). This routine is realized by a computer apparatus mainly comprising the computer 25 in FIG. 7(A), and the first calculating means 44 in FIG. 4(A) is constituted by this computer apparatus. The reception data file 41 in FIG. 4(A) is realized by the receiving parts data 21 shown in FIG. 7(A), the parts data file 42 is realized by the delivery parts data 22, and the basic operation time data file 43 is realized by the various master data 23.

When step S29 in FIG. 9(B) has been executed for calculation with respect to all the shipment units of parts, step S30 in FIG. 8 is now executed. This step is the executed to determine the departure times such as to permit the parts deliverers to depart at a uniform interval per shift. For example, in case of delivering parts with three parts deliverers per shift as shown in FIG. 10, departure times T10 to T15 are obtained. The intervals T(1) and T(2) between adjacent departure times are all equal per shift. In this way, the operation burdens on the parts deliverer operators is uniformalized.

When the parts deliverer departure times have been determined, the parts deliverer that will depart immediately after parts are received is determined for each shipment unit of parts. For example, when shipment units Wa to Wc of parts are received right before the departure time T11 of a parts deliverer as shown in FIG. 10, these shipment units Wa to Wc are tentatively dealt with such that they are to be delivered with the parts deliverer to be departed at the time T11, and the time required for the delivering operation by the parts deliverer to be departed at the time T11 is calculated by adding together the delivering operation times for the individual shipment units Wa to Wc (step S35 in FIG. 8).

If there is no particular reason for otherwise, step S50 for uniformalizing shown in FIG. 8 is then executed. In this embodiment, however, the uniformalizing process is executed under restrictions actually imposed on the delivering operation, and for this reason, step S40 is provided.

Step S40 as shown in FIG. 8 is a preliminary process for the uniformalizing. In the uniformalizing process, the assignment of shipped units of parts to parts deliverers is shifted, while in the preliminary process, a routine prior to the shifting process is executed. For example, if the shipment unit of parts received before the departure time T11 of a parts deliverer includes consecutive division parts Wb as shown in FIG. 10, one half of the delivering operation time Tb for the consecutive division parts Wb is allotted to the T11 departure parts deliverer, while the rest is allotted to the T12 departure parts deliverer. Likewise, if uniform pitch division parts Wa are included, allotment of time for one half is done for the parts deliverer of this time, while the time for the other half is allotted to another parts deliverer to make the delivering pitch uniform (in this case, the T13 departure parts deliverer). Further, if parts Wf, for instance, are supplier-specified parts, the parts We for which the time allotment is made to the T14 departure parts deliverer, can not be carried together with the parts Wf. In this case, the parts We are thus shifted to the T15 departure parts deliverer (as shown by arrow 107). After the above process, the uniformalizing step 50 in FIG. 8 is executed. The uniformalizing step 50 is shown in detail in FIGS. 11(A), 11(B), 12(A) and 12(B), and its contents are shown in FIG. 13.

Figure 11A:
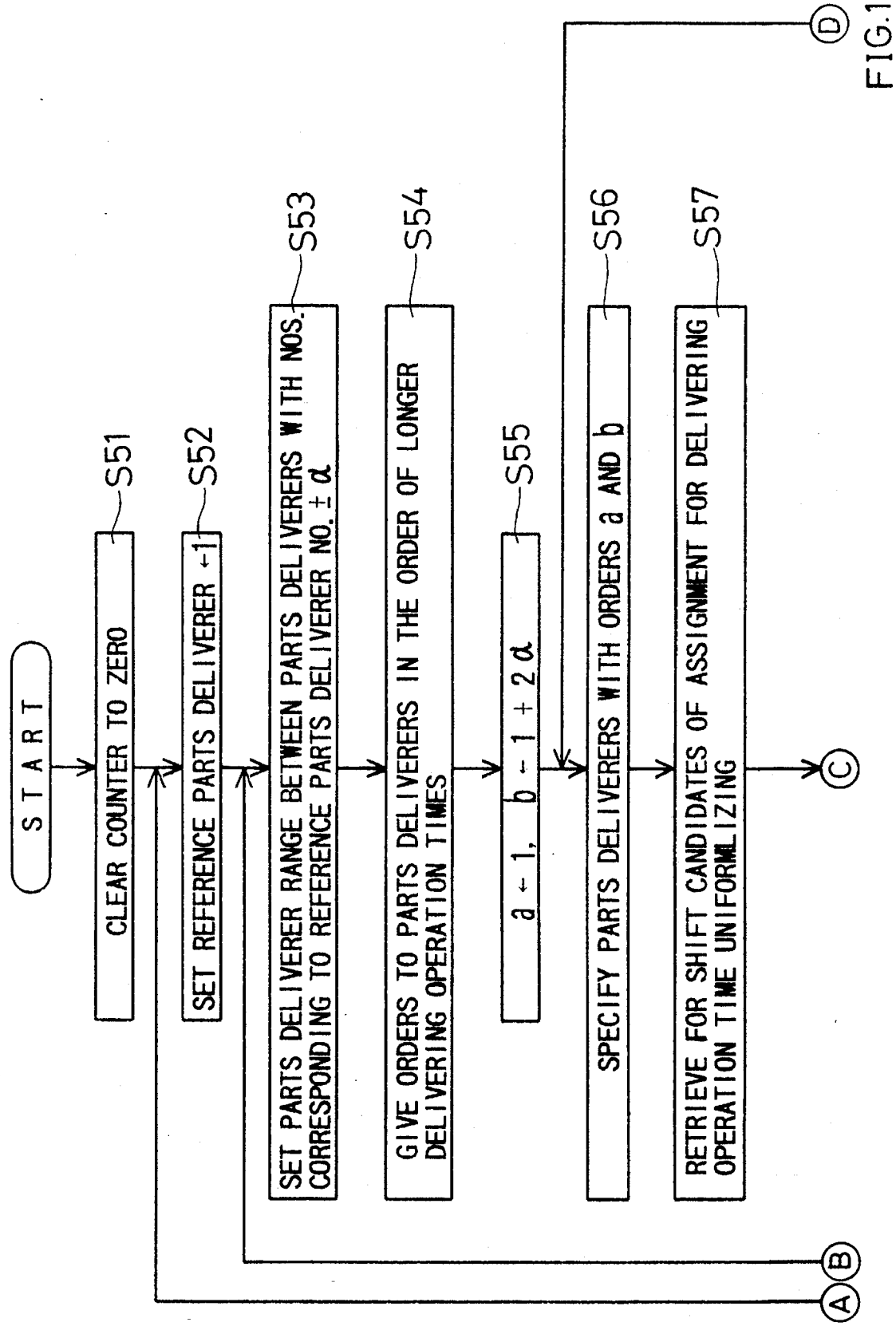
FIGS. 11(A) and 11(B) are a flow chart illustrating a uniformalizing process routine.
Figure 12A:
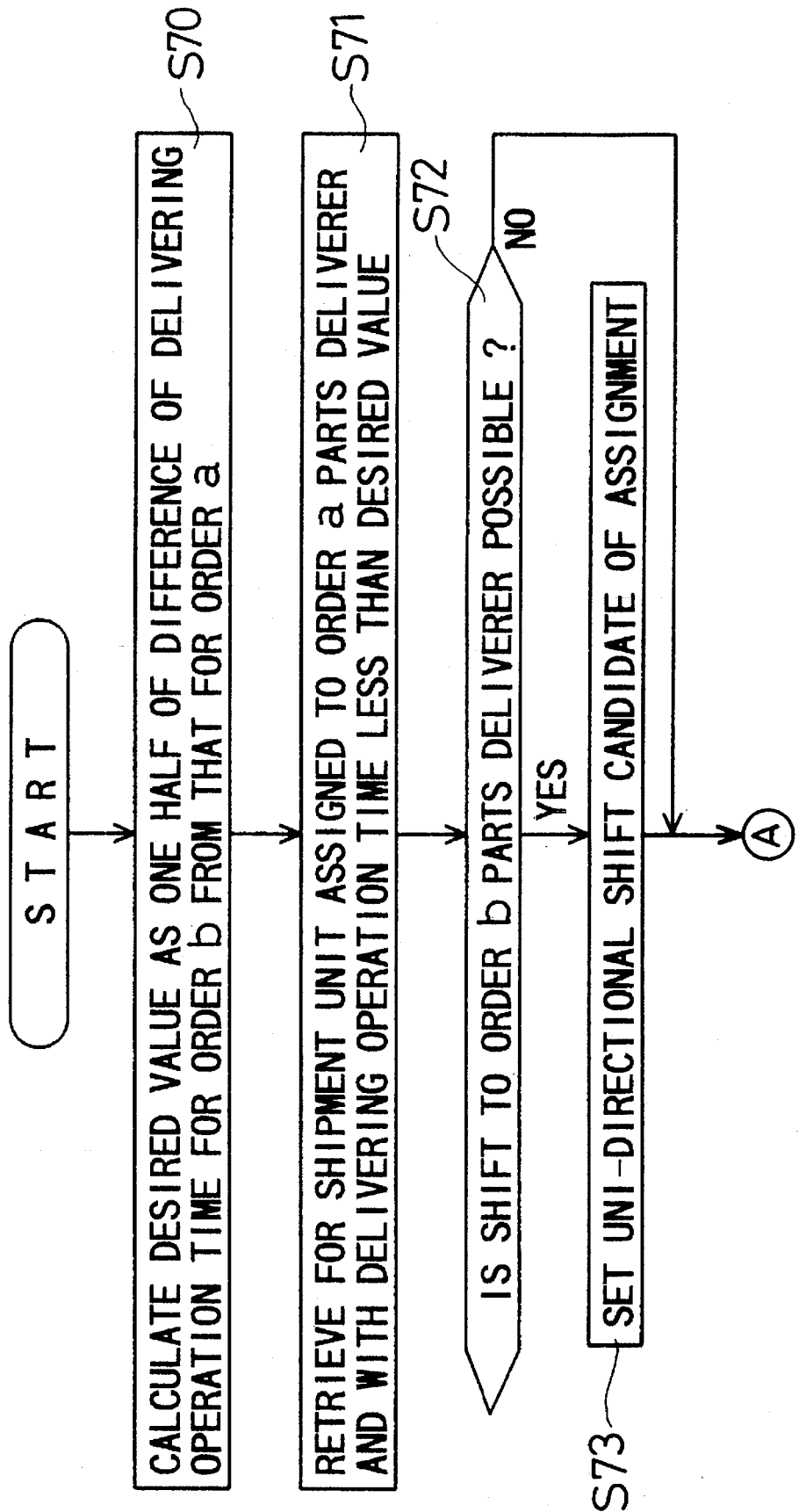
FIGS. 12(A) and 12(B) are a flow chart illustrating a shift candidate retrieval routine for uniformalizing.

Referring to FIG. 11(A), in step S51, a counter for counting times of retrieval execution for the uniformalizing process is initialized to zero. In step S52, a reference parts deliverer for the uniformalizing process is set to be No. 1. In step S53, a parts deliverer range under consideration is set to be between parts deliverers with Nos. corresponding to the sums of the reference parts deliverer No. and $\pm\alpha$. The number $\alpha$ is obtained by subtracting one from the number of the lanes to which parts are transferred from the parts factories. As shown in FIG. 6(B), in this embodiment, three lanes are provided for each course, and thus $\alpha=2$.

Figure 3:
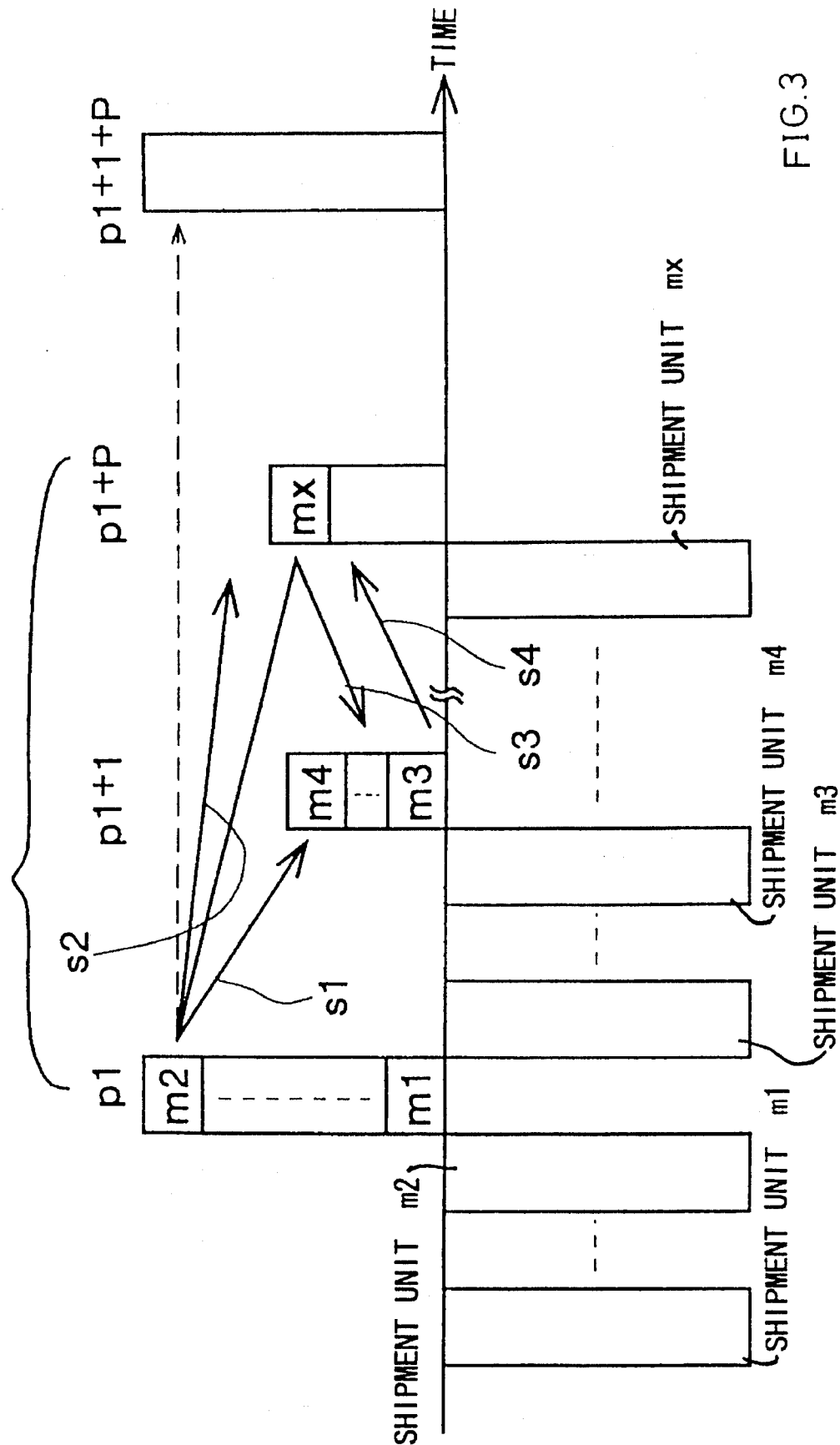
FIG. 3 is a schematic view showing the assignment of shipment units of parts to parts deliverers and shift of the assignment.

Step S53 prescribes a rule concerning the shift of the assignment of shipment units of parts to parts deliverers such that a shipment unit is assigned to either one of a predetermined number (three in this case) of parts deliverers following its reception timing. Since the shipment unit of parts is assigned to either parts deliverer up to the delay corresponding to three successive parts deliverers, it is only necessary to quickly transfer the parts that are unloaded in the parts unloading place 70 shown in FIG. 6(B) to either parts reception lane, that is, there is no need of delaying the timing of transfer of parts to the parts reception lanes. In other words, the shipment unit of parts is delivered by either of the three parts deliverers, and extreme delay of delivery of the received parts is eliminated. The parts deliverer range is extended to decrease parts deliverers No. in order to permit backward re-shift of parts which have been shifted to a forward parts deliverer, as shown in FIG. 3. By permitting the restoration of a parts deliverer from a delayed one, it is possible to make the finally realized uniformalizing level to be extremely satisfactory.

When the parts deliverer range is specified in the above way, step S54 is then executed, in which orders are given to each parts deliverer in the range specified in step S53, in the order of longer delivering operation times. In the example of FIG. 13, the parts deliverers No. 6 to No. 10 are in the parts deliverer range with the parts deliverer No. 8 being the reference parts deliverer. In this case, the orders shown at 131 in FIG. 13 are given to the individual parts deliverers No. 6 to No. 10.

In step S55 in FIG. 11(A), "1" is set as a, and "1+2 $\alpha$" ("5" in this case) as b. In step S56, the parts deliverers with the order a (the first order in this case) and b (the fifth order in this case) are specified. In the case of FIG. 13, the parts deliverer with the first order is the parts deliverer No. 8, and the parts deliverer with the fifth order is the parts deliverer No. 10.

After the parts deliverers with the orders a and b have been specified in the above way, shift candidates in the assignment for uniformalizing the delivering operation times are retrieved for (step S57). This routine is shown in detail in FIGS. 12(A) and 12(B).

In this routine, after the start, step S70 is executed, in which the difference between the delivering operation times of the parts deliverers with orders a and b is obtained, and one half of the difference is made to be a desired value. In step S71, a shipment unit of parts requiring delivering operation time shorter than the desired value are retrieved for among those which are assigned to the parts deliverer with the order a. If any such shipment unit is detected, it is served as a shift candidate since its shift as shown by arrow 132 in FIG. 13 promotes the uniformness of the delivering operation times of the individual parts deliverers.

Such a shift candidate as above is a uni-directional shift candidate of assignment to be shifted uni-directionally from the order a to the order b (step S73). If it is impossible to made a shift to the order b, the step S73 is not executed (step S72). For example, if supplier specified parts have been assigned to the parts deliverer with the order b, for instance, no other shipment unit can be assigned to this parts deliverer, and step S72 thus provides "NO". In another example in which the subject parts are uniform pitch division parts which are assigned to the parts deliverer of departure time T13 in FIG. 10, it is likely that such extent of shift to either one of the parts deliverers with the departure times T12 to T14, substantially meets the requirement of the uniform pitch, but a delay up to the parts deliverer with the departure time T15 no longer meets the uniform pitch requirement. Thus, there may be a case in which a shift to the parts deliverer with the order b can not be made from the standpoint of the uniform pitch requirement. Again in such case, step S72 in FIG. 12(A) provides "NO". Further, as will be described later, there is a case in which a shift as shown by arrow 133 in FIG. 13 is effective for the uniformalizing between the parts deliverers with first and fourth orders. In this case, if the parts assigned to the parts deliverer with the first order were initially assigned to the parts deliverer with the fourth order (i.e., parts deliverer No. 6) and if the shift shown by arrow 133 serves to re-shift back, step S72 provides "YES". However, if the shift candidate is one which is received right before the departure of the parts deliverer No. 8, it cannot be in time for the parts deliverer No. 6, and thus the shift is impossible in this case. In this way, in step S72, a check is done as to whether the shift is possible, and only shift candidates capable of shift are decided as such.

Figure 12B:
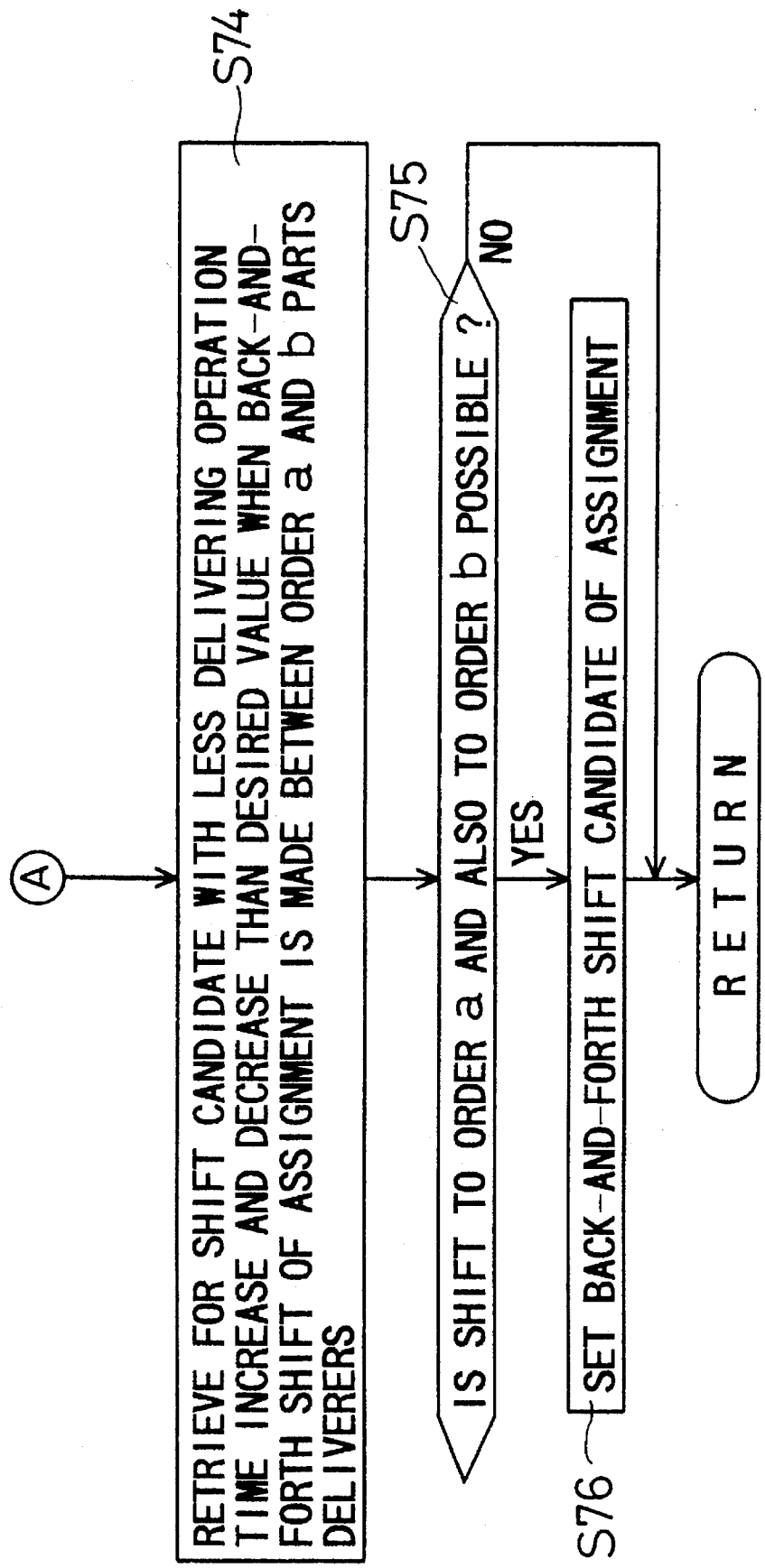
Figure 13:
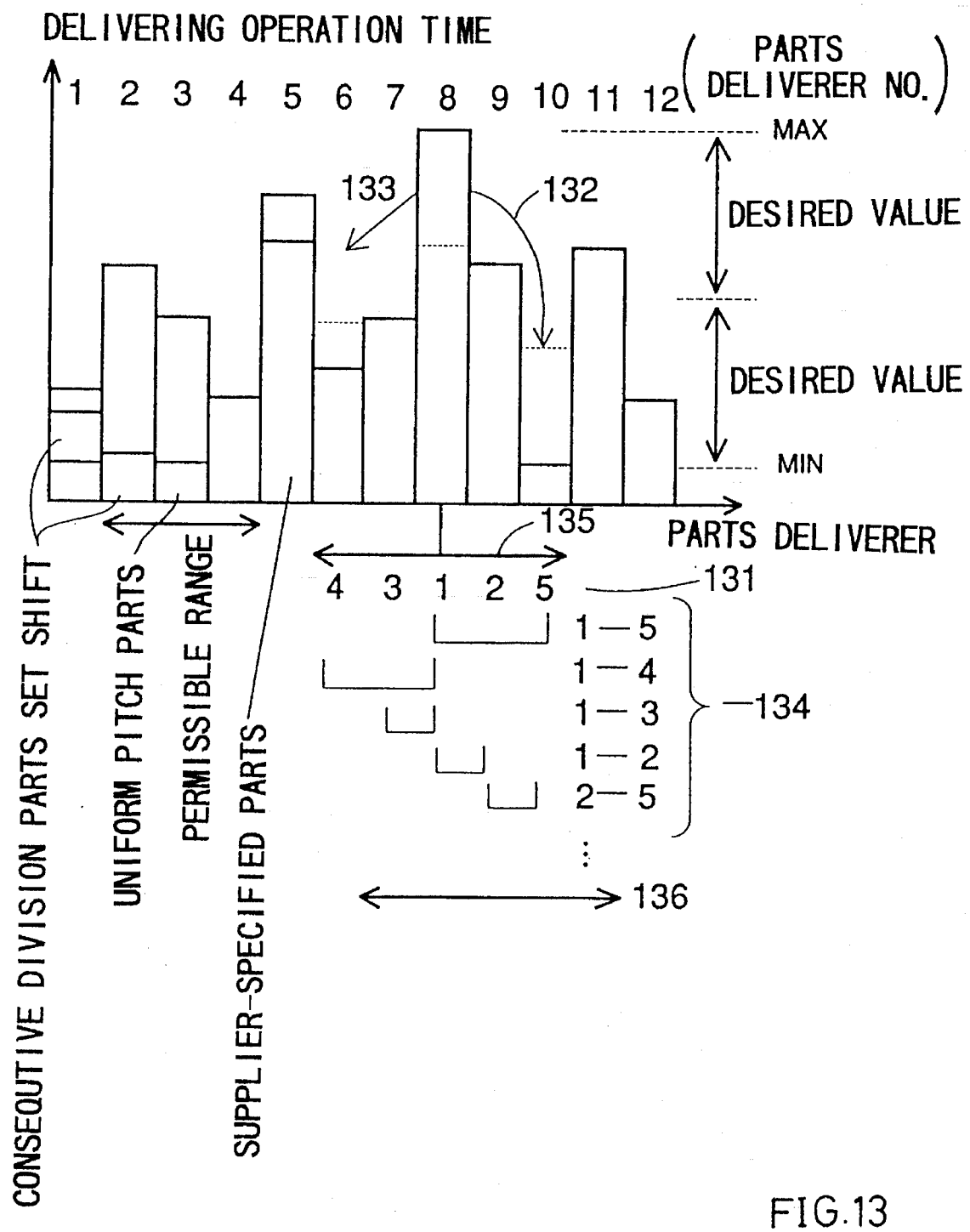
FIG. 13 is a graphic representation of the contents of the uniformalizing process.

In step S74 in FIG. 12(B), shift candidates are retrieved for, which are capable of promoting the delivering operation time uniformalizing through back-and-forth shifts of assignment as shown by arrows s3 and s4 in FIG. 3. In step S75, a check is made as to whether such back-and-forth shift is possible. If it is possible, such a shift candidate is made to be a back-and- forth shift candidate of the assignment (step S76). Such a back-and-forth shift candidate occurs in such case as when re-shifting assignment from a delayed shift.

Figure 11B:
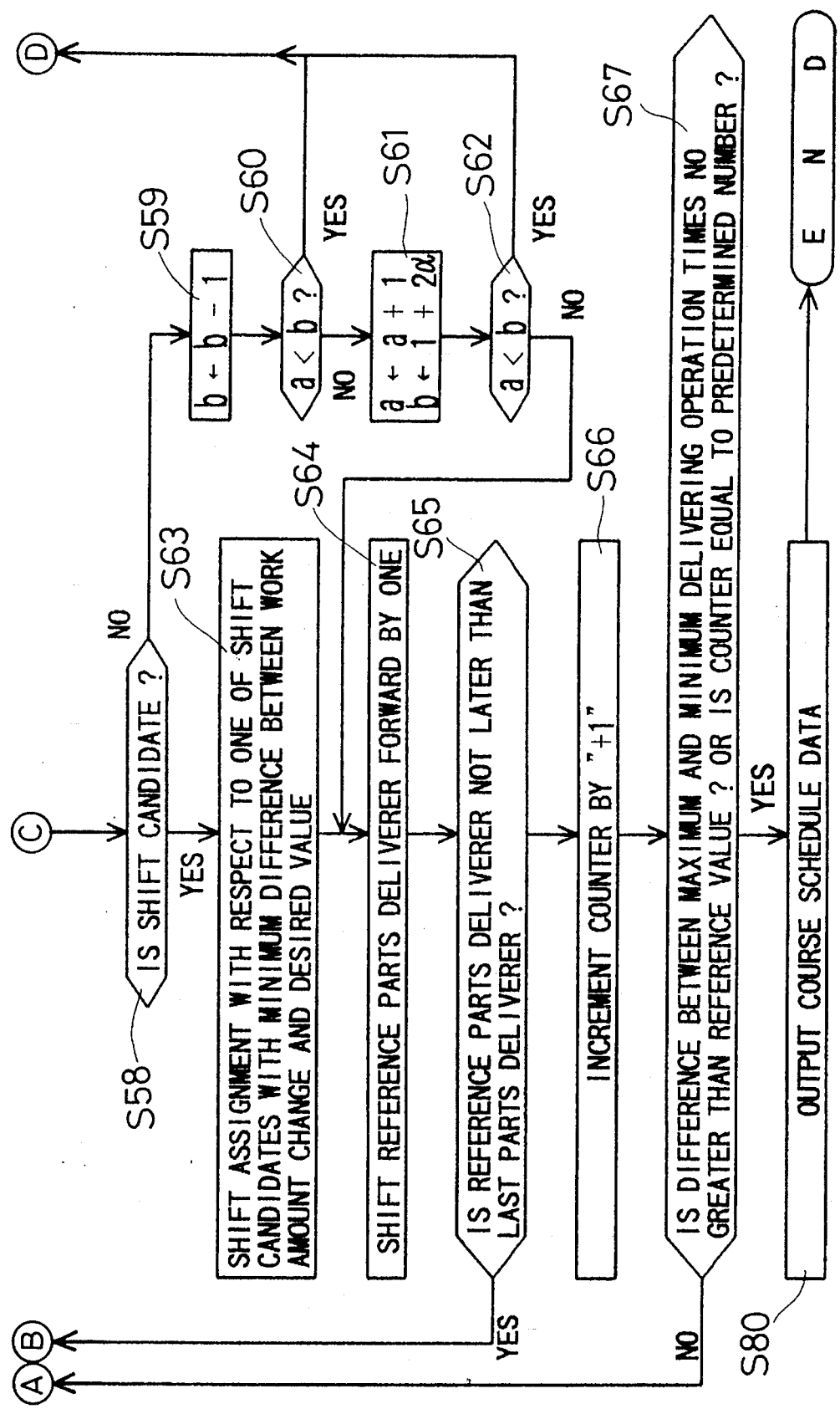

After the above retrieval for shift candidates has been made, step S58 in FIG. 11(B) is executed, in which a check is made as to whether a shift candidate is detected. If no shift candidate is found, b is decremented by "1", and the shift candidate retrieval is done afresh (a process which returns from step S59 to steps S56 and S57). Consequently, the retrieval is conducted in the order as shown by reference numeral 134 in FIG. 13. If no shift candidate is found as a result of retrieval executed in a combination of orders 1-5, 1-4, 1-3 and 1-2, step S60 provides "NO". Then, a is incremented by "1" and b is set to "5". As a result retrieval is made again in a combination of orders 2-5, 2-4, ... The shift candidate retrieval for the uniformalizing may be continued up to a combination of orders 4-5, ... in the last. If no shift candidate is found in the combination of orders . . . 4-5, step S62 provides "NO". At this time, an assignment which can no further be uniformalized has already been realized.

If at least a single shift candidate is found while steps S56 and S57 are executed repeatedly, the assignment is shifted according to a shift candidate corresponding to the minimum difference between a change in the work amount and the desired value (step S63). Consequently, the delivering operation times of the parts deliverers with shifts effected thereto are eventually uniformalized.

When the above routine has been ended with respect to one reference parts deliverer, the reference parts deliverer is shifted by one parts deliverer (step S64). For example, if the previous parts deliver range has been as shown by arrow 135 in FIG. 13, a new parts deliverer range as shown by arrow line 136 is set up for the uniformalizing.

Now, step S65 is executed, in which a check is made as to whether the reference parts deliverer has been shifted from the first to the last one. Unless the reference parts deliverer has been shifted to the last one, the uniformalizing process is continued. When the uniformalizing process has been executed up to the last reference parts deliverer, the number of times of execution is incremented by "1" in step S66.

In step S67, a check is made as to whether the uniformalizing process has been executed sufficiently. If the difference between the maximum and minimum delivering operation times of each parts deliverer becomes less than a reference value, it is determined that a predetermined uniformalizing level has been obtained, and thus the uniformalizing process is discontinued.

While the predetermined uniformalizing level has not yet been obtained, step S52 and following steps are executed repeatedly. In this case, after execution of the assignment shift in step S63, a check is made again as to whether a shift for uniformalizing is possible. Thus, different results are obtained in the first and second times. In this way, the shift candidate retrieval is repeatedly executed for uniformalizing until it is confirmed in step S67 that the predetermined uniformalizing level is obtained, and the final assignment is determined.

Under bad conditions, there may be a case that the predetermined uniformalizing level fails to be obtained by repeating the retrieval any number of times. Accordingly, a step of giving up the uniformalizing process upon reaching of a predetermined number of times of retrieval is provided (step S67).

When the final assignment of shipment units of parts to parts deliverers that satisfies the predetermined uniformalizing level has been obtained in the above routine, course schedule data are outputted in step S80 in FIG. 11(B). The course schedule data constitute an abridgment of shipment units of parts to parts deliverers, and are shown at 28 in FIG. 7(B). The items included in the data 28 are course name and departure time (these items permitting the corresponding parts deliver to be known), parts factory, shipment unit No. of parts and parts reception lanes, these items being related to one another. That is, the data indicate which shipment unit of parts is to be assigned to which parts deliverer for delivery. The data are outputted to a floppy disk and thence inputted to the computer 30 shown in FIG. 7(B). In accordance with parts deliverers and assignment of shipment units, the computer 30 displays, for each shipment unit, the corresponding parts reception place (or lane) (which indirectly indicates the corresponding parts deliverer) to which the shipment unit is to be transferred (see parts reception lane indicator 31 in FIG. 7(B) and step S90 in FIG. 8).

The course schedule data outputted from the floppy disk are further inputted to a computer 33 shown in FIG. 7(B). The computer 33 outputs a delivery list shown at 37 in FIG. 7(B) under control of a delivery list printing unit 34. The outputted list shows, for each parts deliverer specified by the course name, parts reception place (or lane ), lane and departure time, the stop sequence, stop positions, parts shelf array address, parts name and parts factory in a mutual correspondence relation to one another. More specifically, the list indicates all information necessary to manage the parts deliverer running such that the parts deliverer departs from which parts reception lane at what time, the parts deliverer delivers what kind and how many parts transported from which part factory, the parts deliverer runs which course and stops at which place, and what kind and how many parts are delivered to which part shelf array address. In the computers 30 and 33, the same parts reception place (lane No.) is given to the shipment unit of parts, and parts delivery according to a parts deliverer running schedule produced in the computer 25 is automatically carried out when the parts deliverer operators continue parts delivering operations according to the contents of the list 37 shown in FIG. 7(B). Further, at this time the assignment is done such that the parts reception lanes are designated in the order of R1, R2, R3, R1, ... for the individual parts deliverers.

Figure 6A:
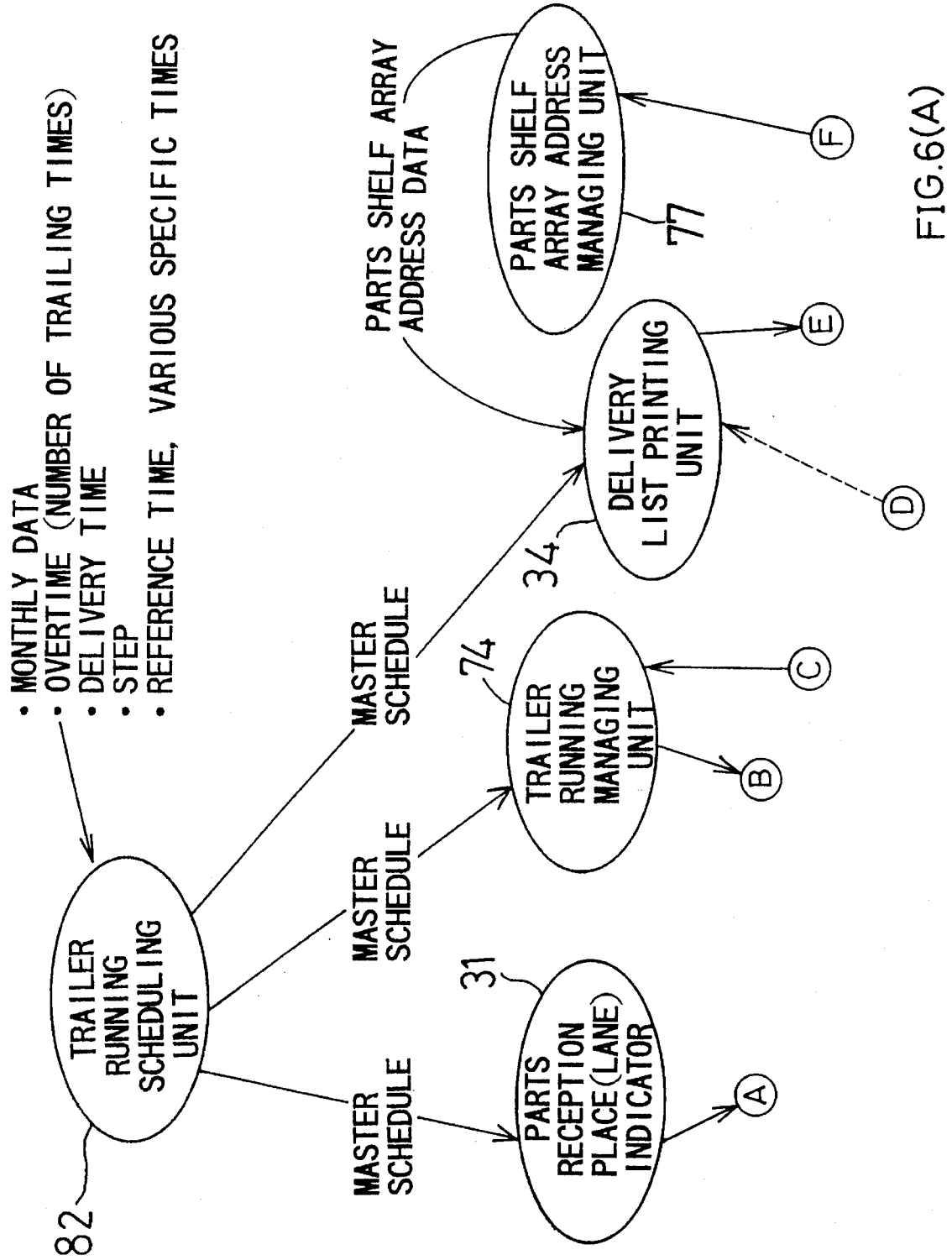
FIGS. 6(A) and 6(B) are a schematic representation of an embodiment of the parts deliverer managing method according to the invention.
Figure 6B:
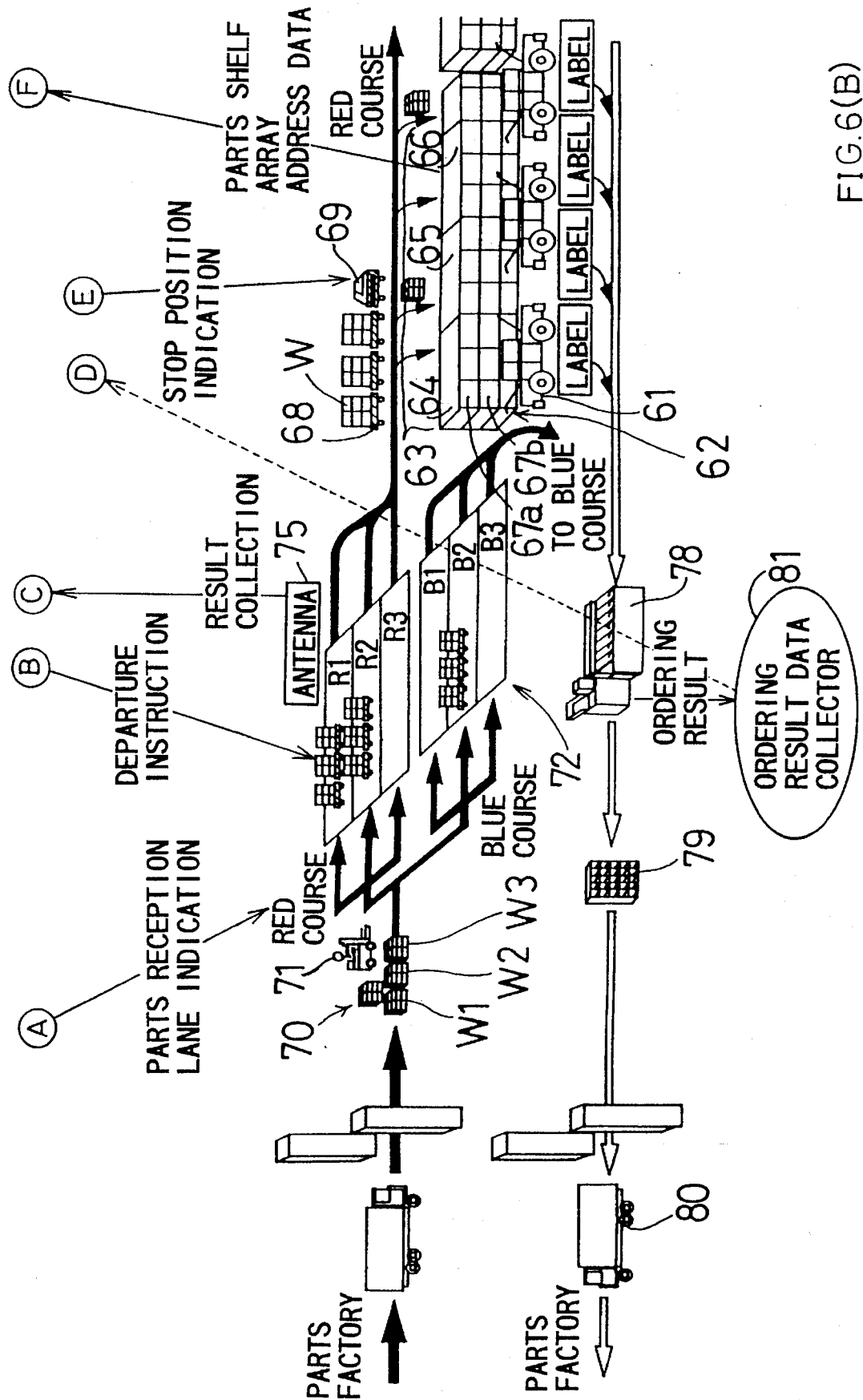

In this embodiment, ordering result data have been collected in the ordering result data collector 81 shown in FIG. 6(B), and it is made possible to grasp in advance that different parts from those in the receiving parts data 21 shown in FIG. 7(A) are to be transported. This is convenient in such case as when excessive stock of specific parts arises occasionally so that the order of these parts is given up. Consequently, these parts are excluded from the shipment unit of parts. In this case, it is not logical to stop the parts deliverer for parts which are not shipped. Accordingly, if abandonment of the order of parts has been known in advance, data of such parts is not provided to the list 37 in FIG. 7(B), thus preventing unnecessary stop.

Further, as shown in FIGS. 6(A) and 6(B), the parts shelf array address managing unit 77 is provided to let data 38 shown in FIG. 7(B) be newest at all times. The computer 33 outputs the list 37 according to the newest data. Thus, even if the delivery parts data 22 is somewhat old, it is possible to eliminate the possibility of instructing erroneous delivery position.

In this embodiment, the first step of calculating the delivering operation time for each shipment unit, is executed in step S20 in FIG. 8 (i.e., the routine in FIGS. 9(A) and 9(B) in detail). In this routine, the delivering operation time is calculated on the basis of the average processing time T1, as shown in step S27 in FIG. 9(B). It is possible to permit more accurate time to be calculated for each kind of parts.

Figure 4B:
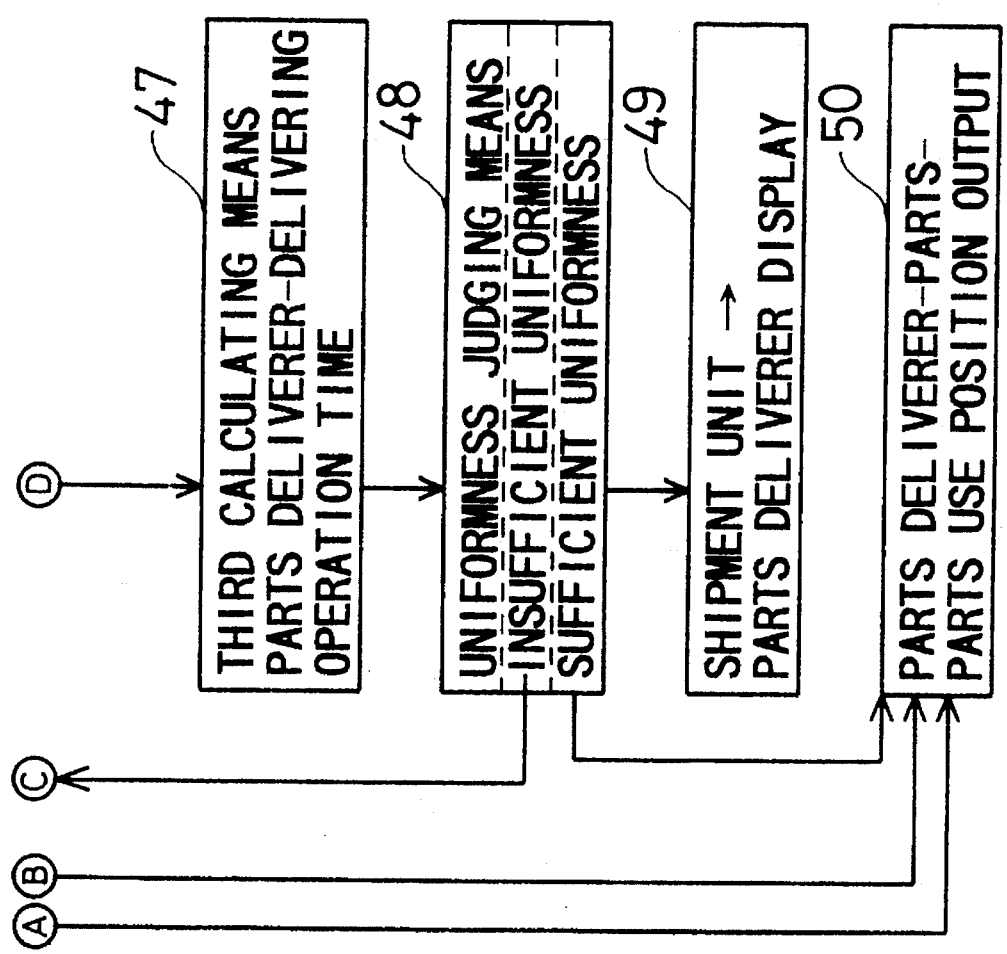
Figure 5:
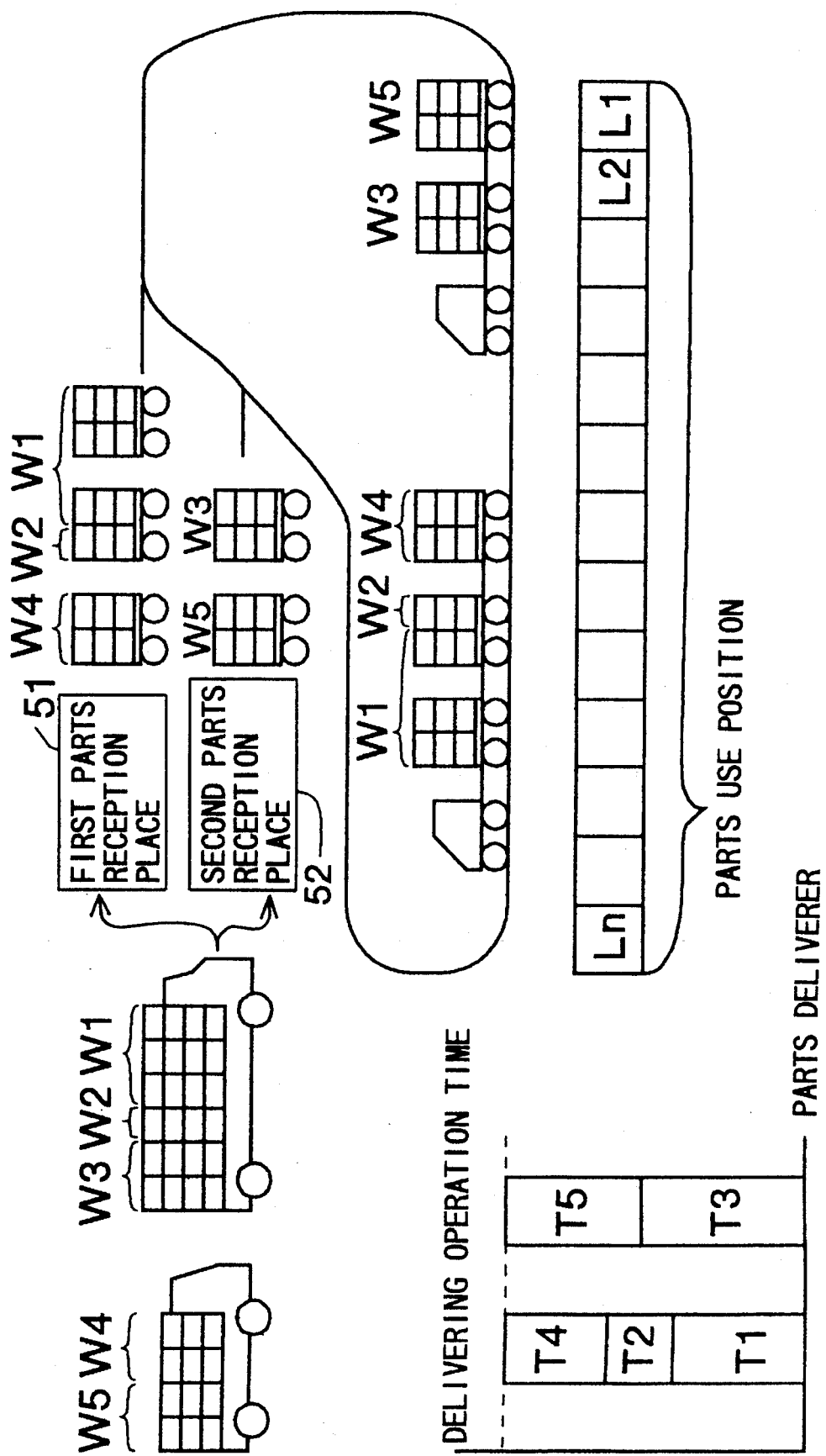
FIG. 5 is a schematic view showing a parts deliverer managing method according to the invention.

Further, in this embodiment, the second step of calculating the delivering operation time for each parts deliverer is executed in step S35 in FIG. 8. The process in step S35 is schematically shown in FIG. 10. In this embodiment, the third step is executed in the routine shown in FIGS. 11(A), 11(B), 12(A) and 12(B). The repeat step is realized in a routine which returns from step S67 to step S52 in FIGS. 11(A) and 11(B). The first calculating means to the uniformness judging means (44 to 48 in FIGS. 4(A) and 4(B)) are constituted by a computer apparatus which mainly comprises the computer 25 shown in FIG. 7(A). The means 49 shown in FIG. 4(B) for displaying the assignment of shipment units of parts to parts deliverers is constituted by the computer 30 and the parts reception lane indicator 31, and the unit 50 in FIG. 4(B) is constituted by the computer 33 and the delivery list printing unit 34. The above construction are only exemplary, and it is of course possible to realize the invention with other processes or apparatuses.

According to the invention, it is made clear which shipment unit of parts is to be delivered by which parts deliverer, thus eliminating the occasion of having resort to the experience and intuition of the parts deliverer operator as in the prior art. Further, the delivering operation time of each parts deliverer is uniformalized, and the delivering operation can be extremely facilitated. Further, while the reception and delivery of parts are continued according to instructions, the overall operation is naturally carried out according to uniformalized running schedule, and thus extremely easy and reliable delivering operation management can be obtained.

While some preferred embodiments of the invention have been described in the foregoing, it is to be understood that these embodiments are by no means limitative and various changes and modifications may be made without departing from the scope and spirit of the invention.

What is claimed is:

1. A method of scheduling the running of parts deliverers for delivering parts received in shipment units to parts use positions comprising:

a first step of calculating the time required for the delivering operation for each shipment unit;

a second step of calculating the delivering operation time for each parts deliverer by abridging operation times calculated in said first step with respect to shipment units to be received between two parts deliverers;

a third step of shifting the assignment of shipment units to parts deliverers such as to uniformalize the delivering operation time for each parts deliverer;

a fourth step of calculating the delivering operation time for each parts deliverer afresh by abridging operation times calculated in said first step with respect to shipment units assigned to the parts deliverers after the shipment unit assignment shift has been effected in said third step; and a fifth step of causing said third and fourth steps to be executed repeatedly until reaching of a predetermined uniformalizing level by the delivering operation time for each parts deliverer as calculated afresh in said fourth step.

2. The method according to claim 1, wherein said third step is executed such that each shipment unit is assigned to either one of a predetermined number of successive parts deliverers subsequent to a parts reception timing, and wherein the shift of assignment is made either uni-directionally or back-and-forth between two parts deliverers.

3. An apparatus for scheduling the running of parts deliverers for delivering parts received in shipment units at a parts reception place to parts use positions, comprising:

a reception data file in which data of kind and quantities of parts in each shipment unit and reception instant thereof are stored in a correspondence relation to one another;

a parts data file in which data of kind of parts and parts use positions are stored in a correspondence relation to one another;

a basic operation time data file in which a basic operation time necessary for the calculation of each delivering operation time is stored;

first calculating means for calculating the delivering operation time for each shipment unit according to the data stored in said three data files;

second calculating means for calculating the delivering operation time for each parts deliverer by abridging delivering operation times calculated in said first calculating means for shipment units to be received between two parts deliverers;

uniformalizing means for shifting the assignment of shipment units to parts deliverers such as to uniformalize the delivering operation time for each part deliverer;

third calculating means for calculating the delivering operation time for each parts deliverer afresh by abridging delivering operation times calculated in said first calculating means for shipment units assigned to the parts deliverers after the shipment unit assignment shift has been effected in said uniformalizing means; and uniformness judging means for starting said uniformalizing means and said third calculating means repeatedly until reaching of a predetermined uniformalizing level by the delivering operation time for each parts deliverer as calculated afresh in said third calculating means.

4. The apparatus according to claim 3, further comprising means for displaying, for each shipment unit, the assignment relation thereof to a parts deliverer when said uniformalizing means and said third calculating means are no longer started repeatedly by said uniformness judging means, the display being made by indicating the parts deliverer with the shipment unit assigned thereto.

5. The apparatus according to claim 3, further comprising means for outputting the result of abridging of the relation between parts and parts use positions for the individual parts deliverers according to the finally determined assignment of shipment units to parts deliverers, said reception data file and said parts data file.

6. A method of managing parts deliverers for delivering parts received in shipment units at a parts reception place to parts use positions, comprising:

a step of providing a plurality of parts reception places at the parts reception place;

a step of designating one of the plurality of parts reception places for each shipment unit;

a step of causing each parts deliverer to deliver all parts in each parts reception place; and a step of causing each parts deliverer to be circulatorily in charge of the plurality of parts reception places;

wherein in said step of designating a parts reception place for each shipment unit, the delivering operation time with respect to parts to be received at the designated parts reception place is uniformalized for the individual parts reception places.

* * * * *